(12) United States Patent
Quon et al.

(10) Patent No.: US 7,466,810 B1
(45) Date of Patent: Dec. 16, 2008

(54) DISTRIBUTED SYSTEM FOR SHARING OF COMMUNICATION SERVICE RESOURCES BETWEEN DEVICES AND USERS

(75) Inventors: Colin Shong Chin Quon, Vancouver (CA); Jeff A. LaPorte, Vancouver (CA); John Thach Vinh Lieu, Vancouver (CA); Miryung Jessica Song, Langley (CA); Taranjit Singh Parmar, Surrey (CA)

(73) Assignee: Neltura Technology, Inc., Richmond (CA)

( * ) Notice: Subject to any disclaimer, the term of this patent is extended or adjusted under 35 U.S.C. 154(b) by 415 days.

(21) Appl. No.: 11/314,745

(22) Filed: Dec. 20, 2005

Related U.S. Application Data

(60) Provisional application No. 60/695,311, filed on Jun. 30, 2005, provisional application No. 60/636,853, filed on Dec. 20, 2004.

(51) Int. Cl.
*H04M 3/42* (2006.01)
(52) U.S. Cl. .............................. 379/201.01; 379/201.02; 379/201.03; 379/221.15; 709/201; 709/202; 709/203
(58) Field of Classification Search ............ 379/142.07, 379/93.02, 93.01, 201.01, 201.02, 201.03, 379/221.15; 709/201, 202, 203
See application file for complete search history.

(56) References Cited

U.S. PATENT DOCUMENTS

| | | | | |
|---|---|---|---|---|
| 5,291,492 A | * | 3/1994 | Andrews et al. | 370/259 |
| 5,684,869 A | * | 11/1997 | Palumbo et al. | 379/182 |
| 5,757,894 A | * | 5/1998 | Kay et al. | 379/127.03 |
| 6,411,697 B1 | * | 6/2002 | Creamer et al. | 379/201.12 |
| 6,748,071 B2 | * | 6/2004 | Milton | 379/246 |
| 7,046,778 B2 | * | 5/2006 | Martin et al. | 379/201.01 |
| 7,046,782 B2 | * | 5/2006 | Miller | 379/207.14 |
| 7,139,377 B2 | * | 11/2006 | Pinault | 379/201.01 |
| 7,171,221 B1 | * | 1/2007 | Amin et al. | 455/462 |
| 7,310,417 B1 | * | 12/2007 | Cook | 379/210.02 |
| 2005/0091381 A1 | * | 4/2005 | Sunder Rajan | 709/227 |
| 2007/0286368 A1 | * | 12/2007 | Gamliel | 379/114.21 |

\* cited by examiner

*Primary Examiner*—Fan Tsang
*Assistant Examiner*—Hemant Patel
(74) *Attorney, Agent, or Firm*—Knobbe, Martens, Olson & Bear LLP

(57) ABSTRACT

A distributed software system provides functionality for users to cluster together various types of computing devices (PCs, mobile phones, PDAs, set top boxes, IP appliances, etc.) and associated service resources (landline telephone, mobile telephone, long distance service, VoIP, instant messaging, etc.) to form a service cluster, and to effectively bind the service cluster to a common user identity. The software system enables each service resource that is natively available to a device in the cluster to be accessed and used by the other devices in the cluster. For example, in one embodiment, a call placed to any device in the cluster can be routed to and answered on any other device in the cluster, transparently to the caller. A cluster owner can also grant permissions to other users to use particular service resources available to the cluster. Routing of calls is handled efficiently using a distributed hash table system.

22 Claims, 9 Drawing Sheets

DISTRIBUTED SYSTEM FOR SHARING OF COMMUNICATION SERVICE RESOURCES BETWEEN DEVICES AND USERS

CROSS-REFERENCE TO RELATED APPLICATIONS

This application claims priority to, and incorporates by reference the full disclosures of, U.S. Provisional Patent Application No. 60/636,853, filed Dec. 20, 2004, and U.S. Provisional Patent Application No. 60/695,311, filed Jun. 30, 2005.

BACKGROUND OF THE DISCLOSURE

1. Field of the Disclosure

The present application disclosure relates to the field of telecommunications generally. In particular this application relates to service convergence of various personal telecommunications devices and services.

2. Description of the Related Art

Telecommunications has exploded in recent history. Where once a single telephone line operated for a number of houses, an individual or household is now likely to have multiple Public Switched Telephone Network (PSTN) lines—such as home and office lines, long distance services, at least one mobile phone, and broadband internet services, just to name a few. The telecom deregulation that started in the mid 1990s brought about the emergence of a large number of Competitive Local Exchange Carriers (CLEC), Inter-exchange Carriers (IXC), cable multi-service providers (MSO), and mobile virtual network operators (MVNO). The market disruption caused by deregulation created many players that serve different aspects of the telecommunication services value chain. For instance, over the same copper local access line to the home, the basic phone service, domestic long distance service, international long distance service, dial up and broadband Internet service, Voice-over-IP (VoIP) service, games, and multimedia content can be obtained from different application service providers.

Enabled by ubiquitous broadband Internet access, telephony services can now be integrated with Internet technologies to create multimedia communications services. Through the Internet, network and location dependent communication services such as landline phone and mobile cellular can now be accessed from a multitude of devices and over a plethora of access technologies including ADSL, packet cable, Wi-Fi, GPRS, and 3G mobile services. It is now common for a user to have multiple IP-connected user devices that can be used to access the communications services offered by different service providers.

Further, broadband Internet users can now access an ever increasing and diverse number of multimedia web services. In addition to the traditional landline and wireless cellular services, broadband Internet also enables new customer choices for unbundled services, such as VoIP and one-number follow-me service.

This increase in technology, telecommunications options, and competitors has created an increasingly complex array of services. Many companies have begun to compete by bundling some of these services. For example, many consumers may now receive their cable television services, local phone services, and broadband internet access from one source. However there remains a large number of disparate services, and users will often pick and choose individual services that they prefer or believe offers the most value.

Existing user communications services such as cellular, landline PSTN, carrier VoIP, and PC-to-PC VoIP are separate services that are accessed using different devices such as a mobile phone, plain-old-telephone, IP phone, and computer, respectively. These services are typically offered by different service providers and bounded to specific serving areas or physical locations. The user may also have other communications capable devices such as the home desktop PC, office laptop, and Portable Digital Assistant (PDA) which can also be used for communications but may not be usable since they are not linked to the user's various communication services or devices.

In addition, a user is generally provided with a different user identity for each of the user's communications services and devices. For online services, a user may have multiple service identities tied to VoIP, instant messenger applications, and chat applications. For offline services, users may be identified by telephone number, cell phone number, or the like. Due to the limitations of existing circuit-switched communications technologies, telephony systems today provide a concept of service identity which is tied to the device to which the provider provides service, rather than an identity that is tied to the user. Service providers employing next generation packet based technologies allow services to be less dependent on the access network and the user device. Similar limitations exist in the online portal services domain where online applications such as instant messenger and VoIP services have different service identities that are not linked with the user's other PSTN services. While portal VoIP services allow simple means to connect users within the online service community, the user has to use different devices and services such as the mobile phone when interacting with users outside of the online community.

SUMMARY OF THE DISCLOSURE

As such, there is a need for a system and method that can cluster the user's service resources and identities into a common user identity to allow common management of telecommunications devices and systems accessed by a user. Due to the significant infrastructure already in place for most telecommunications services, there is also a desire for applications to manage user identities and services close to the "network edge," which generally means on or networked closely to user devices. This allows for less changes or updates to telecommunications infrastructure already in place and also allowing for significant user personalization.

It is therefore an aspect of the present disclosure to provide a method for clustering a user's various communication devices, services and service IDs, and to associate these resources with a common user identity. The devices may include mobile phones, PSTN phones, IP phones, laptops, and PCs. User IDs from various service domains such as MSN, Google, and Yahoo! may also be included in a cluster. Services may include cellular services, broadband internet services, cable or satellite television services, Foreign Exchange Office (FXO) lines available on a PC via a voice modem (FXO is an interface for VoIP devices to connect to standard Private Branch Exchange systems found in many offices), Skype and SkypeOut available on a PC, PSTN network termination services, and many others including new services that become available in the future.

Another aspect of this disclosure is to allow communications between individuals through clusters to be accomplished based on a cluster identity rather than individual service IDs. Furthermore, it is an aspect of this disclosure to provide a method and device for externally transparent distributed call management. This would allow a user to manage his or her cluster and receive calls on a variety of clustered devices, independent of the specific service ID used in contacting him or her. Clustering, as implemented in a preferred embodiment, also allows the user's resources to be consumed on any one of the user devices within the cluster independent of the devices or provider network normally associated with the device. In order to accomplish some of this in one embodiment, a resolver chooses the services to implement a call based on user preferences, least cost routing, and/or various other options. Such routing may be transparent to a user.

It is a further aspect of this disclosure that the clustering and call management features be implemented on the network edge, utilizing the resources of devices included in clusters. It is understood that at some times this may not be feasible, and as such, a service cluster proxy may be used to manage devices that may not have the individual resources to implement the functions.

In one embodiment, each service resource within a user's service cluster may be made available and accessible to other devices within the user's service cluster. For instance, FXO line resources available on the home phone line can be shared with the user's various PCs, or a SkypeOut resource can be shared and accessed from the user's mobile phone via a call-back mechanism or directly over IP services.

Also disclosed are methods for enabling a user to selectively extend some or all of his or her service resources to other users. For instance, the FXO line resource available on one user's home PC with USB voice modem or equivalent IP appliance can be made available and shared with family and friends. Similarly, the SkypeOut resource or other network service available in the user's service cluster can be extended to the user's contacts.

One aspect of the invention is thus a communications system comprising a plurality of user computing devices, each user computing device being associated with at least one communication service such that different services are natively accessible via different computing devices, and such that the plurality of user computing devices collectively provide access to a plurality of different communication services, at least some of which are provided by different communication service providers than others. The communication system also comprises a distributed software system which clusters together the plurality of user computing devices and the plurality of communication services under control of a user of the plurality of user computing devices to enable each of the plurality of communications services to be accessed and used from each of the plurality of user computing devices. The distributed software system comprises client software that runs on at least some of the plurality of computing devices and provides functionality for routing calls between the user computing devices.

The invention also comprises distributed call processing software adapted to run on a plurality of computing devices of a user, including computing devices natively associated with different respective communications services, to form a service cluster in which each of the plurality of computing devices is capable monitoring a status of, and accessing a native communication service associated with, each other computing device. The distributed call processing software is capable of switching calls between different ones of the plurality of computing devices and between different ones of the communications services, such that the user can receive a given incoming call on any one of the plurality of computing devices transparently to a caller placing said call.

The invention also includes a communications system comprising a first cluster of user computing devices associated with a first user, the first cluster of user computing devices providing access to a plurality of communication service resources of the first user; and a second cluster of user computing devices associated with a second user, the second cluster of computing devices providing access to a plurality of communication service resources of the second user. The communication system also includes distributed call management software that runs at least partly on the first and second clusters of user computing devices, and which provides functionality for the first user to selectively grant permission to the second user to use one or more of the communication service resources of the first user to place calls. The distributed call management software also provides functionality for the second user to selectively grant permission to the first user to use one or more of the communication service resources of the second user to place calls, and further including functionality for automatically routing calls according to said permissions.

The invention also includes a computer-implemented method of sharing service resources. The method comprises receiving, and storing on a computing device of a first user, permission data representing a permission granted by the first user to a second user to use a service resource of the first user, said service resource providing communication functionality for placing calls; communicating the permission data over a network to a computing device of the second user; and on the computing device of the second user, using the permission data to route a call initiated by the second user to cause the call to be placed using the service resource of the first user.

The invention also comprises a distributed system, comprising: a plurality of computing devices, each of which runs a software application that implements a distributed hash table system to aid in the establishment of peer-to-peer connections with at least one other device in the plurality of computing devices; distributed database software which runs on the plurality of computing devices and makes use of said peer-to-peer communications to store and retrieve information; and a database application which runs on each computing device and makes use of the distributed database software. The database application implements a directory service to resolve calls between particular computing devices. The database application may also provide functionality to store directory information with the distributed database software, and to retrieve the directory information for purposes of locating and establishing communications sessions with particular users.

Neither this summary nor the following detailed description purports to define the invention. The invention is defined only by the claims.

DETAILED DESCRIPTION OF SPECIFIC EMBODIMENTS

Figure 1:
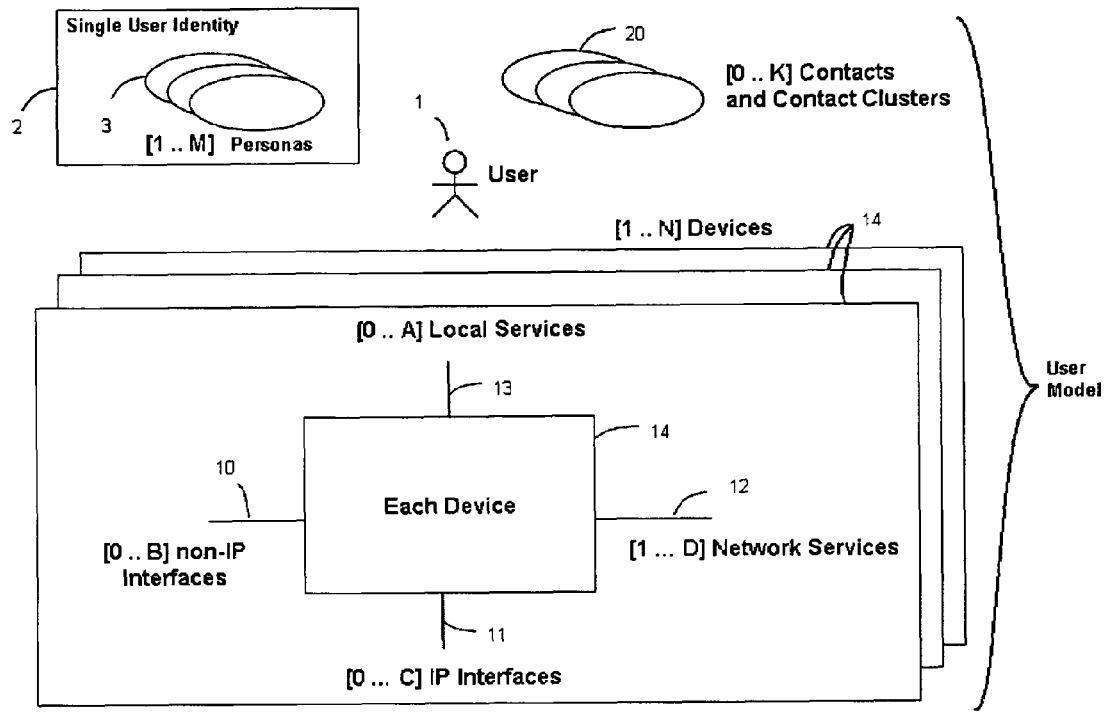
FIG. 1 illustrates a block diagram of a user's telecommunications devices and service connections.

Specific embodiments of the invention will now be described with reference to the drawings. These embodiments are intended to illustrate, and not limit, the scope of the invention. For instance, the specific protocols, algorithms, object models, and user interfaces set forth in this disclosure can be varied significantly, and can be enhanced, without departing from the scope of the invention. The invention is defined only by the claims.

As mentioned above, a typical user owns or has access to several communications devices, each of which are typically associated with one or a small subset of communications network services to which the user subscribes or otherwise utilizes. One feature of the invention is a method for associating the resources and services of the devices into a service cluster so that services can be shared and accessible independent of the user device. For the purposes of this disclosure, it will be instructive to differentiate the services any device may utilize apart from this clustering versus the services that a device may access in conjunction with the clustering described in this disclosure. As such, a service will be referred to herein as "native" to a device if the device can utilize the service without use of the clustering features described herein. For example, a mobile phone's native service may be cellular service accessible over a PLMN (Public Land Mobile Network). A PSTN or VoIP service would not typically be native to a mobile phone, however. It is understood that some devices may have multiple native services—for example, a PC may have a landline telephone service and a VoIP service as native services. In addition, in some cases, multiple computing devices may both have a common native service—for example, a desktop PC and a laptop may have native access to a common VoIP service.

Further, in order for services to be shared and accessible independent of the user device, a method is provided to implement distributed call management so that the service can be switched or bridged from one device to another user device. To enable more convenience and always-on behavior which may not be practical on end user devices, this disclosure also provides a method used to discover, associate, and transact network services which are generally natively bounded to specific user devices to any one of the user's devices independent of the network service.

In one embodiment, for example, a user may have a home phone line native to one or more telephones, broadband services native to a connected home PC equipped with a USB voice modem, and broadband services native to a connected notebook computer equipped with a microphone and headset, all clustered according to the disclosure herein. When an incoming PSTN call arrives on the user's home phone line, that user may now answer the call on his home phone, on his home computer, or on his notebook computer, even while away from home. Similarly, while the user is away from home, the user may now place calls remotely from the notebook PC through the home phone line as if making the call from home.

In another example, a user may have VoIP service, broadband Internet access, and a mobile phone. Another user may have a similar setup as the first user and know the first user based on an instant messaging buddy list. The second user may call the first user by initiating a VoIP call through the buddy list. The first user may wish to take the call on the mobile phone, however, and a distributed call manager according to an embodiment of this invention would reroute the call to the first user's mobile phone without the second user knowing that the change had been made.

Similarly, within the user's service cluster, a user can initiate a call from one of the user's device nodes such as a notebook PC while traveling and have the call switched via distributed call management and media control through the service resources of another one of the user's device nodes such as a FXO line resource on the home PSTN gateway or PC with a USB voice modem.

To facilitate a complete understanding of the disclosure, the remainder of the detailed description describes specific embodiments and features of the invention with reference to the drawings.

As stated, a typical individual has a number of communications devices, each associated with one or more specific native communications network services. For example, a PC may be used to access VoIP, instant messaging, email, push-messaging, and other communications services, and a mobile phone may be used for SMS, voice, push-to-talk, and other mobile services. The communications devices, native services, user context, and user contacts of a typical user can be modeled as illustrated in FIG. 1. Each user 1 has one identity 2 with service interaction personas $3_1$-$3_M$, such as co-worker, father, brother, son, and friend, each of which can be associated with common or specific communications such as office number, mobile number, instant messenger screen name, and chat room handle. For example, a user may have multiple devices, and on a given device may have multiple native services such as MSN and AOL, and may even have multiple identities on the same service. Each user 1 may have social contacts $20_0$-$20_K$ and each of these contacts can be grouped by persona, affiliation, and other logical groupings. Each user 1 owns or shares devices $14_1$-$14_N$ that are used for communications services. A device 14 can be any of a myriad of communication devices, such as, for example, a PC, mobile phone, PDA, IP phone, TV set-top box, or networked gaming device.

Each device further has a set of attributes. A device 14 may have local services $13_0$-$13_A$, such as, for example, media resource, storage, and call processing. Further a device 14 also may have non-IP physical layer or connector interfaces $10_0\text{-}10_B$ such as, for example, RJ11, FXO, FXS (Foreign Exchange Subscriber), PRI (Primary Rate Interface), GSM (Global System for Mobile communication) and CDMA (Code-Division Multiple Access) for interface to the PLMN, PSTN and local media interfaces such as micro-phone and speaker, as well as visual displays such as video or graphical user interfaces (GUI). Each device 14 also has IP-based interfaces $11_1\text{-}11_C$ that may be implemented or provided through a variety of physical or connection layer packet services such as Ethernet, GPRS, CDMA1X, Wi-Fi, and Bluetooth. A device 14 also has native network services $12_1\text{-}12_D$ such as POTS, long distance dialing plan, cell phone service, instant messenger, push-to-talk, SMS, and Skype PSTN calling services. The IP interfaces $11_x$ and non-IP interfaces $10_y$ are used to provide a set of connectivity services to enable service and resource discovery, binding, and transaction of the local services 13 and network services amongst the user's owned or shared devices $14_1\text{-}14_N$.

Using the user identity 2 and personas 3, the user 1 can deploy any number of distributed call management client software instances on any user device 14, some of which may be deployed as proxy services on a core network service gateway (discussed below) for lesser resource devices 14, such as mobile phones. Each of these user instances authenticate and sign-in asynchronously and can run concurrently on any one of the user's devices 14 or as a proxy service on one or more core network service elements. Each instance of the user client or proxy client on a service element is uniquely identified by an end-point identifier, and is optionally given time-bounded service access such as through a granting ticket. The private user data is dynamically and/or persistently stored on one or more of the user devices 14 or one or more core network service elements in centralized or distributed data-stores. A user may have multiple service identities 12 such as MSN messenger, Yahoo Messenger, Skype, and other non-online services such as a home PSTN line. Through clustering the user's devices 14 at the network edge as well as proxy services at the network core, the services available on these devices 14 or accessible via the proxy service of the network core can be federated through the identity of the user's service cluster. The service identities 12 may have different service persona 3 within the service cluster. For instance, a user may use MSN messenger, Skype, and an office phone line within the service cluster with co-workers, but the Yahoo Messenger and home PSTN line with family and friends. While this may continue to differentiate a user 1's multiple personas, this can be done transparently to any outside observer who may utilize a single cluster identity to contact the user.

1. Example User Interface and Interactions

Figure 14A:
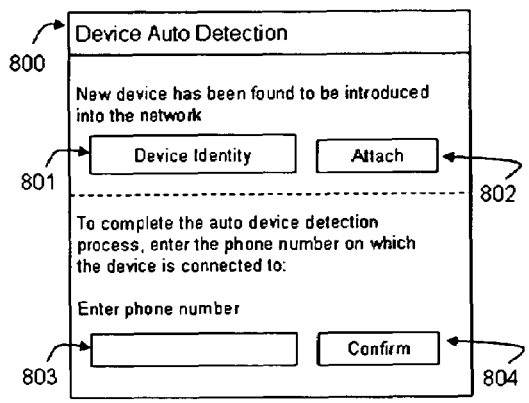
FIGS. 14a-14f illustrate sample graphical user interface screens for performing various call routing tasks that may be performed according to an embodiment of this invention.
Figure 14B:
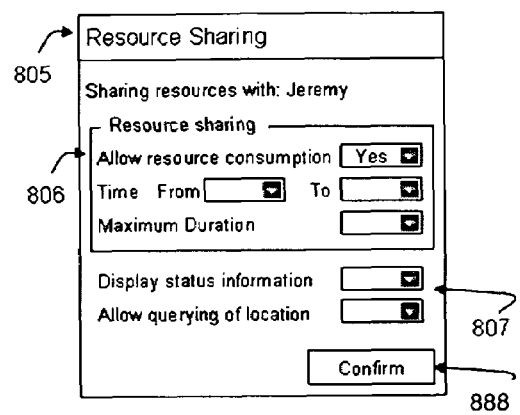

Before delving into the specifics of implementing the various methods and features of the invention, it is instructive to see how a user may interact with devices 14 that could be included in a system of this disclosure. More specifically, an example set of user interface screens that may be presented on a user's device 14 via device clustering software will be described with reference to FIGS. 14a-14f. First, to simplify the clustering of devices 14 with service resources such as PSTN FXO line service, or other devices providing a service, a device auto detection scheme may be used. FIG. 14a shows an auto-detection provisioning display screen 800 that may be presented to the user when a device 14 equipped with clustering software is introduced into the network. The user will enter the peer-node identifier into a data entry box 801 of the screen. The device identity may typically be identified on the back of the device 14 with a peer-node identifier. The user may then confirm that the user wishes the device 14 to join a cluster by selecting an acknowledgement button 802, which may be labeled "Attach;" hitting a specified device key; or any of a number of various other confirmation options.

A user may also have to enter the phone number 803 with which the device is associated. The user inputs this information into a data entry box. The user then confirms the data entered by depressing an acknowledgement button 804.

A user may elect to share telecommunications resources of her cluster of devices and services with others, such as friends or family. To accomplish this she invokes a resource sharing profile menu 805, an example of which is pictured in FIG. 14b. This menu outlines some possible information that is used to provision the sharing preference and service access policies for a particular user. For instance, the user may share resources with "Jeremy" who is a trusted contact within the user's set of user contacts.

In this particular resource sharing profile example, the user can specify, via display element 806, whether or not "Jeremy" is allowed to consume the resources, the time from which the resources can be consumed and the maximum duration for each time a service can be consumed. In other embodiments, other parameters may restrict use, such as, for example, allowing "Jeremy" or other users to use resources only to call a certain person or number, only to call a certain geographic region, such as an area code. The permission may also specify a maximum cumulative or per call time period, in which case attempts to use the service resource beyond that time period may automatically be blocked.

The user may also choose to share status information or allow "Jeremy" to query the location of the user from option boxes 807. The user then confirms the data entered by depressing an acknowledgement button 888. More specifically, and by means of example, a user may decide that she needs a typical local phone line service (PSTN) but that she does not make any use of it between midnight and 4:00 am. Her friend Jeremy, who may have just moved to Australia, might wish to utilize that line so that he does not need to use one of his devices, such as his mobile phone, to make overseas calls to people in the user's local area. The user may then share her line with Jeremy from 12:00 am to 4:00 am. Jeremy's local client will then interact with the user's local client to transfer calls from one of his devices to her PSTN network service.

In one embodiment of this resource-sharing, a user's sharing of service access with a second user may be dependent on that second user also sharing resources with the first user in a reciprocal arrangement. In such a case, resource managers 101-7 (FIG. 6) from each user may communicate through transport brokers 103 to determine if such a reciprocal arrangement exists before allowing one of the users to utilize the other's services. In another embodiment, sharing resources may be dependent on some fee for the use. Such a fee may be user-specified or system standardized and per use, per call length or periodic, in various embodiments. The fee transactions might also be accomplished in a number of ways. The system may simply utilize a credit system wherein a first user may specify, for example, a number of uses or maximum amount of time that any or certain other users may have in utilizing that first user's services. In another embodiment, user clients 60, 70 (FIG. 2) or a service gateway 50 may track actual monetary value and communicate with various consuming user's own service accounts (such as a Verizon wireless account or an AT&T long distance account) or financial accounts (such as a user's checking account or credit card account).

Figure 14C:
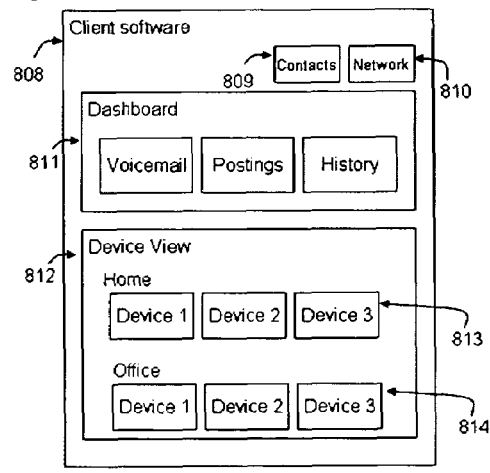

During normal operation, a device 14 may generally display information regarding the user's contacts or the user's network. FIG. 14*c* shows a possible network view, having icons, buttons, tabs, and/or the like, to change between displays for Contacts 809 or Network 810. The network view, as shown in FIG. 14*c*, may be used to display the overall information pertaining to a particular user. In this example depiction, a dashboard 811 shows possible information conveyed to the user such as awaiting voicemail and postings to be retrieved, and history information pertaining to past activities of the user. Information pertaining to the devices owned by the user 812 also may be presented to provide a view on the activity states of each device 14. The example depiction categorizes devices belonging to the home 813 and those that belong to the office 814.

Figure 14D:
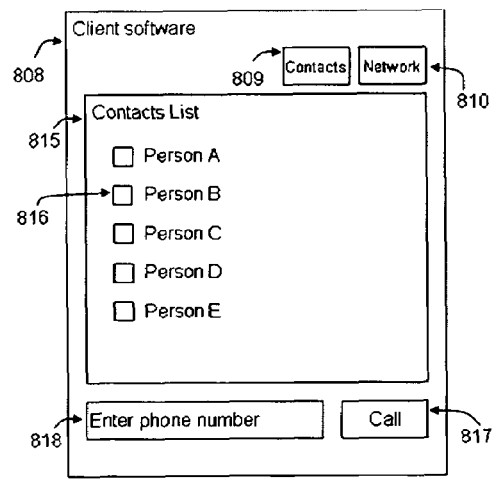

FIG. 14*d* displays an example of a typical resulting screen after engaging the contacts button 809 or similar tab, icon, or the like. In this depiction, the contact list 815 belonging to the user is displayed. This shows the various contact individuals who are known to the user and may also show presence information for such contacts. The presence information may be depicted as an image 816 to present information about, for example, Person B, such as Online, Offline, Away, Busy, etc. If a desired contact is not in the user's contact list, the user may also manually enter a phone number into the data entry box 818 of the destination that the user wishes to reach. Upon completing the data entry portion, the user can press a call button 817 to initiate a call sequence.

Figure 14E:
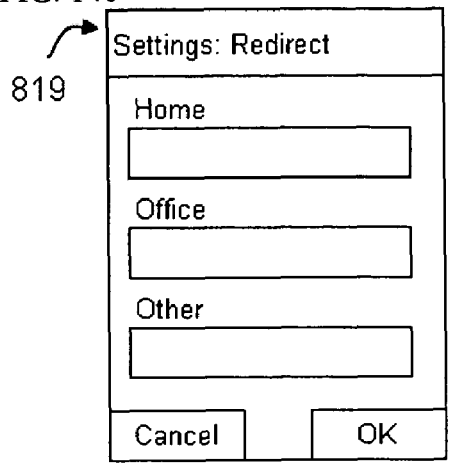

The disclosure herein also enables an individual to invoke dynamic call dispositions. That is, on an incoming call request, the user can dynamically determine where the call is to be handled. For expediency purposes in responding to a request, the user may pre-specify where the calls can be directed. An example redirection settings panel 819 is depicted in FIG. 14*e* and may allow the user to enter in numbers that are commonly used to handle a call. In this example, the user can enter one or more phone numbers, pertaining to numbers generally associated with their home, office or other phone number destination. This call disposition may be handled on any one of the user devices 14 including, for example, on an IPTV set-top box that displays call control information on a television screen to allow the user to handle the call via a remote control. The call disposition control can be used by the call initiator or the call receiver.

Figure 14F:
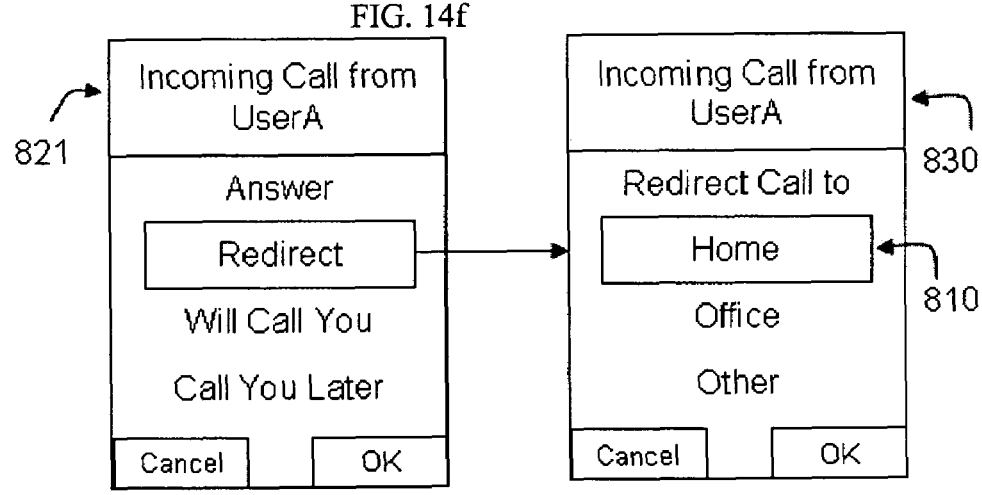

FIG. 14*f* shows the interaction that may occur with a graphical user interface upon an incoming call request. At the time a call comes in to a device 14, a possible alert message 821 may be provided to the user. In this example, the user has the option to answer a call; redirect it to another device 14; provide notification to the other user of an expected call-back time; or merely advise the other contact member that a call will be made later. The last two of these options may be useful when a user is able to see that a call is coming in but is busy or otherwise interested in taking the call at a later time while still wishing to acknowledge receipt of the call. On choosing the Redirect option, a menu 830 of possible locations to which the call can be routed is presented; note that the possible redirection may generally be determined by the information that had been set in the Redirect settings panel 819 of FIG. 14*e*. By selecting a location to which to route the call and acknowledging the selection by pressing an acknowledgement button, here labeled "OK," the user is able to receive the call at that location. In this example, home indicator 810 is chosen as the destination. Although not shown in this example, the user may also choose to queue the call "will call you" such that the call can be reestablished from the original caller to the callee or from the original callee back to the original caller. The user can also reject the call request (call you later) and have the call handling message sent back to the caller in multimodal session such as instant messaging instead of voice.

As will be apparent, the foregoing screen displays and call management options are merely illustrative of one possible embodiment of the invention.

2. Architecture Overview 2.1. Solution Deployment

Figure 2:
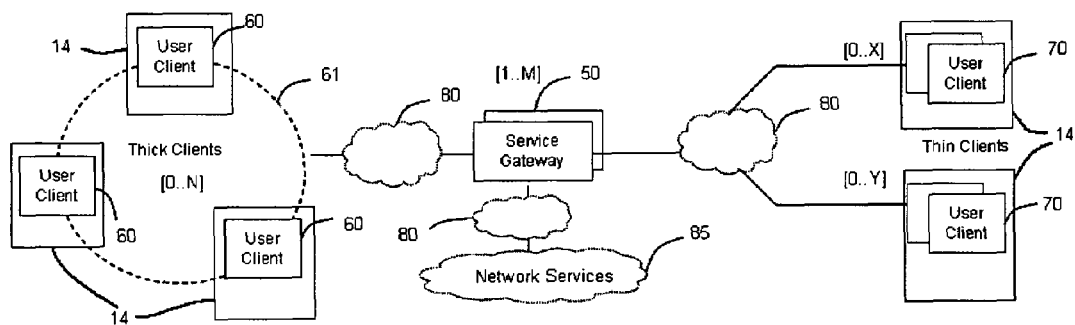
FIG. 2 illustrates a block diagram of the system architecture according to one embodiment of the invention.

A system architecture according to one embodiment of the invention is shown in FIG. 2. Client software 60 on richer resource user devices, such as a PC or PDA, with suitable connectivity 80, can be deployed to create a user device services cluster 61 to take advantage of the computing resources and accessible network services available on the user's owned and shared devices 14. The client software for these devices may be referred to as a "thick client" and may implement some or all of the following: integrated VoIP user agents, user contact management, device clustering and presence propagation, full disaggregated soft-switching capabilities, integrated client applications such as push-to-talk, call nudge request, and call linking. These client capabilities and service applications may be exposed through a set of APIs for the solution client GUI or for integration with existing or future software applications.

Alternative client software, thin client 70, can also be deployed on lesser resource user devices 14 such as lower end IP appliances, TV set-top boxes, and mobile phones. Thick clients 60 and thin clients 70 communicate with a user through the GUIs, examples of which are discussed above with reference to FIGS. 14*a*-14*f*. To cluster the resources and services of the lesser resource devices 14 running thin client 70, together with the resources and services of the richer resource devices 14 running thick client 60, a service gateway element 50 is used to proxy the services of lesser resource user clients 70. In one embodiment, the service gateway 50 elements are implemented using commercial off-the-shelf computing platforms, operating systems, system high availability middleware, database management systems, and industry standard web service components.

Although both a thick client 60 and a thin client 70 are provided in the illustrated embodiment to accommodate different levels of processing resources, the invention does not require both types of clients. Further, additional types of clients could be provided in other embodiments to accommodate additional types of devices.

Each user who subscribes to or otherwise participates in the clustering services of the preferred embodiment can have a set of computing devices 14 on which user client software 60 and/or 70 runs. For example, a user may have a cell phone, a personal computer, and a PDA, each of which may connect to the Internet via a different respective Internet service provider. Each of these devices is called a distributed call management node. The set of distributed call management nodes that belongs to a user forms a cluster.

Clustering, as implemented in the preferred embodiment, is a means of grouping user resources together and binding them to a single identity. The user resources can be various network devices such as mobile phones, PSTN phones, IP phones, laptops, and PC. The user resources can also include user identities in various service domains such as MSN, Google, Yahoo!, and the like. With clustering, a communication session between any caller and callee may be created by using the single identity of the caller and callee.

The clustering approach implemented in the preferred embodiment enables a collection of user resources to be bound to a single entity, and enables subscriber centric communication rather than device specific communications. In addition, the task of selecting a user device 14 for the endpoints of communication session can be automated and made transparent to the users, while also limiting, or even eliminating, the concept of native services. For example, in one embodiment, the address of the active devices 14 of the caller and callee are presented to the call engine, and the call engine may select one of the active caller's devices 14 and one of the active callee's devices 14 to originate and terminate the call based on a predefined algorithm and pre-specified user preferences. This allows a first user to call second user and reach the second user on whichever device is most convenient for the second user. Without this feature, the first user may have to place calls to several different devices 14 to reach the second user. This feature is also available when a nonuser of the clustering services calls a cluster user. While a nonuser may attempt to contact a user by dialing the phone number associated with that user's office number, for example, the call manager 100, and specifically the resolver 202 (FIG. 6, discussed below), may reroute that call to a user's mobile phone without the nonuser being aware of the change, let alone needing to call multiple numbers to contact the user.

The solution architecture discussed here pushes much intelligence to the end user devices 14 at the "network edge." The blended network edge and core network solution architecture in this embodiment provides a number of advantages. Service innovation is typically faster and less expensive at the network edge, thereby allowing the service provider greater flexibility to experiment with new service concepts, invite the participation of third party developers, and personalize the end user services. Service deployment is not as dependent on core network service integration or deployment of any incremental core network infrastructure. The intelligent network edge design also enables users to self-subscribe to services, enabling more flexibility in linking multiple services across different networks, and providing more dynamic and context driven service provisioning. By leveraging the capabilities and greater intelligence at the network edge, the service provider can shift some of the cost burdens and implementation complexities associated with core network solutions to the network edge to provide more cost effective services.

While this discussion focuses on an embodiment that attempts to keep intelligence close to the network edge, the present invention is not so limited. The teachings of this invention are equally applicable to servers and solutions that may be, at least in part, more deeply embedded in the network core.

The thin and thick clients 60, 70 may, for example, be downloadable via the Internet from a provider of the clustering services described herein to the devices 14, and may be stored persistently on such devices 14 in Flash memory, hard disk memory, and/or any other type of computer storage. The service gateway software 50 is typically maintained in hard disk storage of the server or servers on which it runs.

2.2. Service Gateway

Distributed call management and media control and end point management services are not always feasible on user devices with constrained CPU processing, memory, power consumption, and connectivity resources. In those cases, a core network service element operating as a service gateway 50 may be used to proxy such lesser resource user devices 14 so that such user devices 14 can become part of a user service cluster. This service gateway 50 can also act as proxy for all user devices 14 for interfaces to core network services such as instant messenger, Internet Multi-media Subsystem (IMS) services, and PSTN interconnects. Because any or all of the user's devices may be turned off at any given time, the cluster service proxy can also act as an always-on virtual node within the user's device cluster.

The service gateway 50 is a centralized software component that is adapted to be hosted by one or more service providers (e.g., MSN, Yahoo!, Cingular, AOL, etc.). The main function of the service gateway is to bridge the services of the core network and the user's devices 14. For core network interfaces, the service gateway interfaces to the service provider core network. For example, for AOL, there may be an interface to the AIM presence server, AIM contact list server, and AOL TotalTalk VoIP interconnect servers.

For user device interfaces, the service gateway 50 interfaces to the user's devices 14 such as PC and mobile phone. For instance, a user may have a PC, a mobile phone, and a TV set-top box which form a service cluster. The service gateway 50 would provide the authentication and identity management for this cluster of devices and associated services. For lesser resource devices such as the mobile phone, the service gateway 50 also acts as a service proxy. For instance, while a PC can handle media mixing and sophisticated call management, a mobile phone with generic software typically cannot. The distributed call management functionality for the mobile phone within the cluster is therefore handled by the service gateway.

Figure 3:
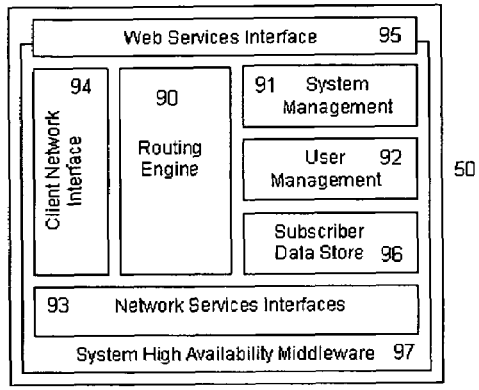
FIG. 3 illustrates a block diagram of a service gateway according to one embodiment of the invention.

One embodiment of the service gateway 50 of FIG. 2 is illustrated in further detail in FIG. 3. In this embodiment the service gateway includes a set of carrier-grade service components that run on one or more physical servers of the core network of a service provider or service portal. A service gateway 50 according to one embodiment of this invention is preferably designed to cost effectively scale from a small number of users to millions of users and hundreds of thousands of simultaneous sessions. In addition, it may be designed to fit within a service provider core network and may be applicable to an Internet Multimedia Subsystem (IMS) core network infrastructure service network. The service gateway has core system components or modules 90, 91, 92 and key sets of system interfaces 93, 94. While this discussion discloses three core system modules and two key system interface sets, it should be recognized that other suitable embodiments may have more or less modules or sets to accomplish the same or similar tasks. The modules 90-94 may be stored on any type of computer storage devices (e.g., hard disk drives, solid state RAM, etc.) and may be executed by one or more general-purpose computers.

The core system modules in this particular embodiment are: a service routing engine 90, a system management module 91, and a user provisioning and management module 92. Service routing engine 90 implements a sophisticated and flexible session switch with an integrated application service layer which provides the capabilities for session setup, routing, modification, and tear down. This service routing engine 90 has similar call logic as the disaggregated session softswitch implemented on the thick client PC software 60, discussed below. Generally, user service features such as call linking, network call initiation, presence propagation, and contact list synchronization are enabled and managed by the service routing engine 90. User management 92 and system management 91 modules provide data management of user and service data, as well as management capabilities such as system administration, data backup, failure recovery and switch-over, and detailed call record generation.

As mentioned above, the preferred embodiment uses two basic sets of system interfaces: (1) thick and thin user client service interfaces 94, and (2) core network, service application, and network web service interfaces 93. The user client interface 94 provides direct or peer-to-peer gateway inter-working with user clients 60, 70 on PC, mobile phone, TV set-top box, and other end user devices. Communication between user client interface 94 and user clients 60, 70 may be by wired and/or wireless communication.

The user client network interface 93 provides bridging of core network services with intelligent network edge applications. It also provides the proxy service interfaces and service inter-working between solution software clients on lesser resource user devices 14 such as Java 2 Platform Micro Edition (J2ME) mobile phones and TV set-top boxes. The network service interface 93 also provides interfaces to core network service elements such as the IMS infrastructure, mobile services platforms, portal presence and contact management servers, and telephony service controllers.

The web services interfaces 95 expose the service capabilities of the service gateway 50 and the underlying user services network through a standard-based set of web services. The web service interfaces for service provisioning and system administration of the user provisioning 92 and system management 91 subsystems.

Subsystems in the service gateway 50 may be implemented on top of a middleware layer involving third party system components for system availability and survivability 97, database management 96, process thread management, and application messaging distribution.

2.3. Thick User Clients

Figure 4:
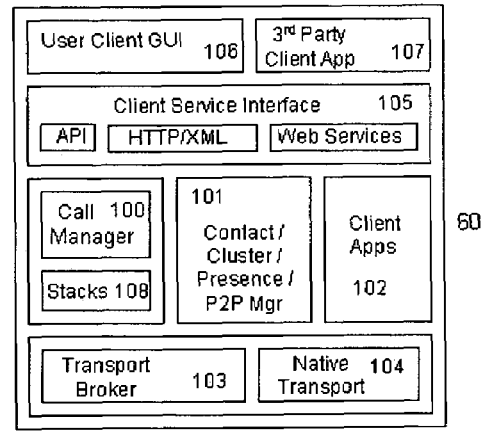
FIG. 4 illustrates a block diagram of a "thick" client according to one embodiment of the invention.

FIG. 4 shows an embodiment of a "thick" client 60 as may generally be used on PCs and other devices 14 with sufficient computing resources. Thick clients 60 are relatively intelligent distributed call managers similar to a disaggregated softswitch. The thick clients may contain one or more of the following: an integrated user agent, an aggregated presence server and cluster manager, contact management software, service and device profile management software 101, web service interfaces 105, and a graphical user interface 106. These clients 60 may optionally have a peer-to-peer services layer for direct peer-to-peer services discovery and distributed data stores. In addition, a transport broker 103 may be implemented for traversal of highly sophisticated and restricted firewall and NATs as well as message and data security and encryption.

Figure 5:
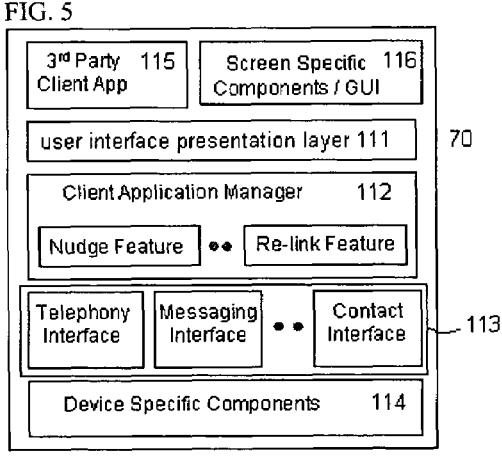
FIG. 5 illustrates a block diagram of a "think" client according to one embodiment of the invention.

With further reference to FIGS. 4 and 5, the optional integrated user agent 101 may be a full feature SIP user agent fully integrated with third party Session Initiation Protocol (SIP) stacks 108-5, Real Time Transport Protocol (RTP) stack 108-2, media processing engine 108-1 and SIP user agent 108-3, and registrar 108-4, collectively stacks 108. See FIG. 6. Call engine 100 provides a sophisticated and highly flexible call management engine for session service routing, translations, service resolution, and least cost routing and may be a disaggregated session softswitch. This call engine 100 is fully capable of integrating a variety of call legs via online services such as Skype, trunking services such as FXO or PRI interfaces, as well as multimodal services such as push-to-talk, instant messaging, and call request signaling. The aggregated manager component 101 is a distributed presence agent and server with the capability to aggregate and propagate presence status to all service access points within a user's cluster of devices and services. Manager component 101 is shown in more detail in FIG. 6. In the illustrated embodiment, the manager component 101 contains contact manager 101-1, as mentioned; message manager 101-2; presence manager 101-3; client manager 101-4; cluster manager 101-5; profile manager 101-6, as mentioned; resource manager 101-7; and net services manager 101-8. The contact manager 101-1 provides contact import, synchronization, administration, and presentation to the graphical user interface. The service and device profile manager 101-6 provides the authentication, profile definition, and resource access policy control for each device and service within the user's device and service cluster. Other elements of manager component 101 may be discussed in more detail below.

Figure 6:
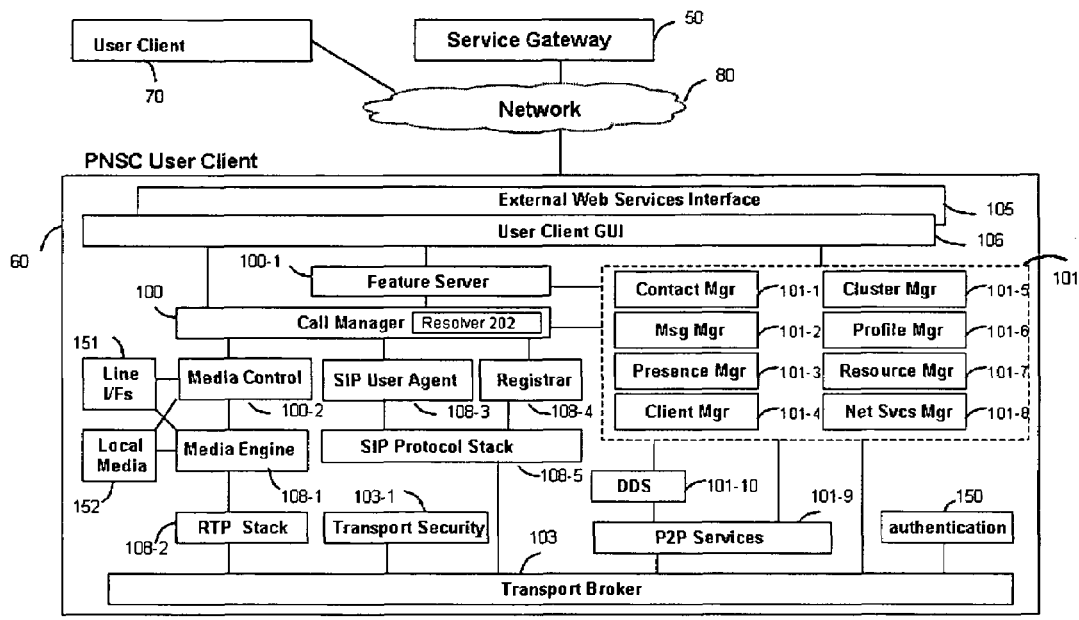
FIG. 6 illustrates a block diagram of a distributed call management node according to one embodiment of the invention.

The disaggregated session softswitching, presence, cluster, contact, service and device profile, and peer-to-peer service functionality may be exposed through a web services interface 105, shown in FIG. 6. Third party applications 107 (FIG. 4) may be built easily to extend or personalize the user client 60 capabilities. Web services interface 105 may also be used to integrate with third party applications such as instant messaging applications. It is also preferable to allow service plug-ins to be quickly implemented and deployed to link disassociated services into the solution services network.

The user client services may also be exposed as a graphical user interface 106 (FIGS. 4 and 6). The graphical user interface 106 of a typical solution software client may show a user's buddy list, presence and availability of the user's contacts in the buddy-list, and the device status such as on-hook, off-hook, busy, and off-line of the user's cluster of communications devices 14. It further preferably provides the user interface to initiate and link call requests, and visual interface to access call logs and voice messages. Many possible configurations, elements, and designs for a graphical user interface 106 are possible, and the listing of some potential aspects of a graphical user interface 106 should not be read as limiting the invention's scope.

Manager component 101 interacts with other devices 14 in a cluster through the transport broker 103 (FIG. 4). Cluster manager 101-5 (FIG. 6), specifically utilizes exterior connections of the transport broker 103 to communicate with other devices 14 in the cluster, whether running a similar thick client 60 or a thin client 70 in conjunction with a service gateway 50. Manager component 101 communicates with call manager 100 when making a call by taking a call request from the user—generally through a GUI (see FIG. 14*d* and discussion), determining services to utilize and passing the call request to the call manager.

2.4. Thin User Clients

A configuration of a thin user client 70 is shown in FIG. 5. Thin user client 70 is a software client designed particularly for resource-constrained devices 14, such as mobile feature phones and TV set-top boxes. A user's thin user client 70 works in conjunction with a service gateway 50 to provide the equivalent or near equivalent functionality of a thick user client 60 as a node within a user's service cluster. A thin user client 70 is preferably designed for easy portability between different model phones from various manufacturers and other embedded devices. It may also be designed and optimized for resource constrained processing capabilities, limited memory, constrained graphical user interface, limited battery life, and/or expensive air link transport.

Thin user client 70 may have a device specific component set 114 which adapts the client service application to underlying device specific APIs where necessary and device-specific characteristics such as screen size or device-specific platform defects. It may also have a core set of service packages 112, such as call linking and call request, which can be easily packaged at time of deployment to suit different application needs. FIG. 5 also shows a nudge feature and re-link feature as part of the client application manager 112. For descriptions of the "Nudge" feature and "Relink" feature, please refer to "Dynamic Context Driven Call Control and Service Bridging", U.S. Provisional Patent Application No. 60/695,311, filed Jun. 30, 2005. The client software also preferably implements a device user interface adaptation layer (not shown) so that applications can be easily tailored for devices 14 with different screen sizes and user interface input methods 116, as well as vendor specific multimedia API. The application services are presented to the user via a graphical user interface 116 implemented on top of the user interface presentation layer 111 for a variety of common mobile devices.

The thin user client software 70 also has services interfaces 113 for integrating with third party client applications 115 such as instant messengers and multi-party chat mobile applications. It also provides a set of system interfaces 113 for controlling the telephony services, messaging services, and access to device or network resources such as user contact lists.

3. Distributed Call Management

Generally. call processing management including translations and dial plan is distributed along a network edge as user clients 60, 70 on user devices 14, such as PCs, as well as on core network service elements, such as the service gateway 50. Collectively, the distributed call management clients on the user end devices 14 and the proxy call management services on a service gateway 50 provide a virtual softswitch for the services within the user's service cluster. Taken as a whole, with all distributed call management clients 60, 70 and call management services on service gateways 50 operating as a network, this network of distributed call management nodes may provide a super scalar softswitch with vast call processing capabilities with exceptional service resiliency and feature scalability attributes.

FIG. 6 illustrates a distributed call management node as may be implemented on a PC-based user client 60. Distributed call management, according to an embodiment of this invention, is a method that disaggregates and distributes the session call switching capabilities found in traditional centralized call servers. In the preferred embodiment, these call switching capabilities are handled by the thick user client 60 with richer resources, such as PCs at the network edge. The same distributed call switching can also be deployed for lesser resource user devices 14 like mobile phones as a proxy service running on a core network service gateway 50.

This switching capability running at either the user device or on the service gateway allows session call switching amongst the user's cluster of devices and network services. For example, a session originating from a PC user device may be switched to another local service such as a FXO PSTN line or to any one of the network services. As another example, an originating call request from a thin user client 70 on a mobile phone can specify an alternate call access number such as the home phone line, and a call terminating call disposition can specify an alternate number such as the office phone line, and the interconnection service between the originating and terminating call legs can be routed through an alternate network service via the routing engine 90 of the service gateway 50.

The following subsections detail the functionality of many of the components involved in the system and methods of distributed call management.

3.1. Call Manager Node

Not all service components shown in FIG. 6 need to be implemented to provide a disaggregated switching capability. The primary switching components used are call manager 100, feature server 100-1, media control object 100-2, along with supporting services of presence manager 101-3 and profile manager 101-6. The same or similar switching capability can be implemented in a centralized service element in the service gateway 50 operating as a proxy to clients 70, running on lesser resource devices 14 such as mobile handsets and TV set-top boxes.

At the network service access layer, thick client 60 implements the transport broker 103 for firewall and NAT traversal, transport layer security 103-1 for signaling and data encryption and security, client authentication 150 for access control to the services network, and P2P services 101-9 and distributed data store 101-10 for the peer-to-peer services networking. Collectively, this network service access layer provides a set of mechanisms for end user devices to act as peers on a virtual network, and together with the profile manager 101-6 and cluster manager 101-5 allows users to setup ad-hoc networks which enable IP-to-IP communications. In other embodiments, an alternate network services access layer can be implemented through traditional server-client architectures without involving a peer-to-peer service access layer.

A number of service managers can be integrated above the client network service access layer. The core service manager is a distributed call manager 100 (FIG. 6) with distributed feature server 101-1 and distributed media controller 100-2. The distributed call manager 100, feature server 100-1, and media controller 100-2 may be optionally integrated with a fully functional user agent 108-3 and media engine 108-1 which may include media processing, media conferencing, codecs, and media QoS management. An example of such a media engine is the voice engine provided by Global IP Sound. The media controller 100-2 and media engine 108-1 may be optionally integrated with TDM line interfaces 151 such as FXO via voice modem which includes drivers and line processing software such as caller ID demodulation, and local media 152 which includes drivers, tuners, and control interface for media input such as microphones and media output such as speakers. The distributed call manager 100 may also be integrated with signaling subsystems such as SIP registrar and proxy 108-4, and SIP protocol stack 108-5 including support for header compression and protocol mediation. The distributed media controller and media engine may also be optionally integrated with IP media transport RTP stack 108-2 with RTCP support.

The distributed call manager 100 in the preferred embodiment provides sophisticated call routing and network translations, and supports a broad range of telecom features, including TDM or IP PSTN gateway, conferencing, and voice mail. This distributed softswitch also implements an optional signaling server function which allows the user client to host and control commercial off-the-shelf SIP phones, analog-telephone-adapters ATA, and soft clients. A resolver within the call manager 100 provides mapping of IP end points and user contacts, including the support for resolving user known-as PSTN virtual numbers and service persona to actual IP service end points. The user agent 108-3 provides an integrated user agent and back-to-back user agent allowing the user client software 60 to register into and control by service elements of the core network such as IMS, centralized SIP server, or a service gateway 50 routing engine 90.

3.2. Call Manager

The routing engine 90 in the service gateway 50 (FIG. 3) and the call manager 100 in the thick user client 60 (FIGS. 4 and 6) both implement sophisticated and distributed session call management capabilities with extensible call features. Call manager 100 in the preferred embodiment is a disaggregated, decentralized softswitch component based on a half-call architecture, including address resolution, signaling and media control functions. The call model implements the solution context by providing the routing, translations, and call control for IP call-legs such as SIP-based calls or Skype, PSTN trunk call-legs such as FXO or SkypeOut, and local device call-legs such as microphones and speakers.

The call manager 100 supports the translation, resolution, and routing of calls between any half-call leg and another half-call leg. An individual of ordinary skill in the art will know how to implement the switching capabilities based on the half-call design. Features such as concurrent or follow-me ringing, and conferencing make use of half-call models to construct sophisticated call objects and call features.

In one application instance, call manager 100 has the capability to route call legs to and from standard SIP devices, peer endpoints with similarly equipped client software, POTS lines, and a local terminal. In another application instance, call manager has the capability to route call legs between network services such as Skype and the user's PSTN or PLMN services through interconnect services such as SkypeOut so as to connect a user's mobile phone into a call session. Network service interconnects may include PRI in the case of a customer premises deployment, or SIP signaling in the case of integration with the next generation softswitch core network. Generally, network types of half calls are abstracted from the switching logic. An exception to this is the dialed number resolver, which integrates knowledge of the network type of the incoming leg to determine the outgoing address set.

Figure 7:
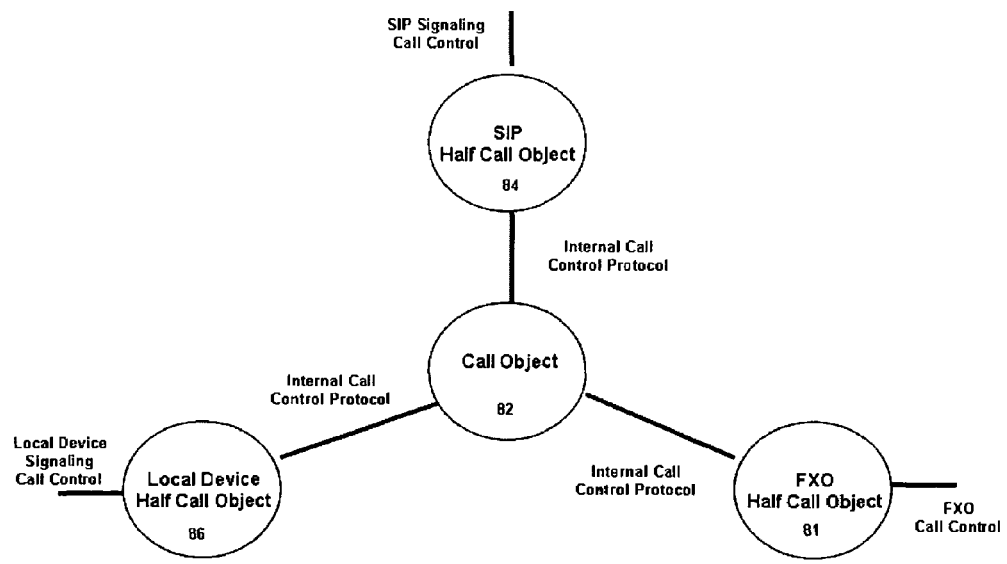
FIG. 7 illustrates a routing function of one implementation of the call manager.

FIG. 7 is a half call diagram that depicts a collection of call control objects and their relationship at runtime. The figure depicts the call control objects and the signalling protocol links between them. The scenario depicted in this figure serves as an example. Many other runtime collections of half call objects related to a call object are possible. In particular, the number and type of half call objects may vary. Any of the half call types enumerated in the following section, "Trunk Types and Half Call Representation," may also exist in such a configuration at runtime, for example. Furthermore, various other half call types would be compatible with the invention herein.

Each of the Local Device, FXO, and SIP Signalling Call Control protocols represents the trunk-specific signalling method for which the corresponding half call adapts the system. The Internal Call Control Protocol is a unified call control protocol to which each of the half call object types adapts its particular trunk-specific signalling method. The call manager may utilize a call object to serve as a signalling message router directing the flow of call signalling messages between the half call objects and maintaining global call state.

3.3. Trunk Types and Half-Call Representation

The call manager's half-call based design allows for straightforward support of many network protocol types and extension to future network protocol types. Each half-call interface type preferably consists of the following parts: A call manager 82 internal signaling interface implementing a unified signaling protocol for originating and terminating legs; an external signaling interface conforming to the protocol specification of the network protocol type supported by the half-call type for originating and terminating leg types 81, 84, 86; and a media endpoint implementing media source and sink support for the supported network protocol type. Note that by convention, the use of the terms "originating" and "terminating" are based on the scope of an individual signaling leg, not the scope of the overall call. That is, a leg incoming to the call manager 100 is handled by a "terminating" half-call, and a leg outgoing from the call manager handled by an "originating" half-call.

3.3.1. Local Half-Call Interface

A local half-call 86 interface represents the user device 14 on which the distributed call management thick user client 60 is installed. The signaling interface is presented to the user via the user client GUI 106. The local half call media source is set to one of the user device's audio inputs, typically the microphone input. The local half call media sink is set to one of the user device's audio outputs, typically the speaker output.

3.3.2. SIP Half-Call Interface

The SIP half-call 84 interface implements an interface to SIP signaling elements. The SIP Originating half-call implements a SIP UAC (User Agent Client) as its external signaling interface element, and the SIP terminating half-call implements a SIP UAS (User Agent Server) as its external signaling interface element. The associated SIP half-call media endpoint may implement an RTP and RTCP (Real-time Transport Protocol and Real-time Transport Control Protocol) media interface with support for a variety of audio and/or video codecs.

3.3.3. NelturaSIP Half-Call Interface

The NelturaSIP half-call interface implements an interface to other distributed call management clients. This interface uses common signaling and media procedures with the SIP half-call Interface, with some important distinctions. NelturaSIP endpoints utilize a modified addressing mechanism based on Peer-to-Peer components 101-9, 101-10 (FIG. 6). Also, SIP and RTP traffic transmitted and received by the NelturaSIP half-call Interface is tunneled by the transport broker 103 to provide robust NAT traversal.

3.3.4. FXO Half-Call Interface

The FXO half-call 81 Interface implements an interface to a Voice Modem device connected to the user device 14 running the thick client 60. A POTS/FXO phone line is connected to the voice modem via a line interface 151. The FXO originating and terminating half-calls implement a signaling interface to the voice modem driver software in order to provide a signaling link enabling, e.g.: on-hook, off-hook, caller id, ring detection, distinctive ring detection, DTMF tone detection, and DTMF tone generation. A media interface to the FXO line supporting audio source and sink is also associated with the FXO half-calls.

3.3.5. Skype Half-Call Interface

A multitude of other half-call interfaces may be provided. For example, a Skype half-call interface may implement an external signaling interface supporting the Skype API protocol. Alternate half call interfaces for other VoIP networks such as AOL TotalTalk, GoogleTalk, and MSN may also be interfaces implemented in various embodiments.

3.3.6. Shared Half-Call Interface

A shared half-call interface implements an interface to other distributed call management clients 60. This interface uses common signaling and media procedures with the NelturaSIP half-call interface, with some important distinctions. Shared half-call originating and terminating endpoints represent users and providers of shared resources, respectively. As such, shared half-call legs have additional authorization requirements over and above NelturaSIP half-call endpoints. Shared terminating half-call endpoints ensure that the user initiating the shared leg from the originating distributed call management client 60, 70 has the right to initiate a shared leg to the given address via the terminating distributed call management client 60. This determination is made by checking for the existence of a shared lease granting termination rights to the requesting user for the shared resource on the terminating distributed call management client 60. This check is performed by querying for such a lease via the resource manager 101-7 (FIG. 6). The query operation parameters include the user id of the calling user, and the called address. If the query operation reveals that a lease granting termination rights exists for the given user, and that time and called address information is available, then the shared terminating half-call will allow the call leg to proceed.

3.3.7. Distributed Media Management

Media management functionality may also be implemented in much the same way as distributed call management. Preferably this is accomplished in conjunction with the distributed call management features discussed herein. This has the effect of distributed media processing leveraging the resources of the end user devices 14 and other distributed media resources that is directly controlled by a local distributed call management or through a proxy media control within the user's device service cluster.

3.4. Resolver

A call manager 100 may feature a novel dialed number or calling identifier resolver 202 that enables subscriber-centric routing, user identity and least-cost routing. The resolver implements a resolution algorithm that determines, given an incoming leg type and address, the appropriate outgoing session leg type(s) and address(es) to achieve one or more of the following aims: (1) least-cost routing among multiple available trunk options, based on cost of terminating over a trunk, or a cost heuristic in place of the absolute cost of terminating over a trunk; (2) network cloning respecting address space, enforcing correctness, without access to cloned network authentication; (3) dialing transparency, ie: preservation of the PSTN dialing experience for the calling user; and/or (4) a fast, deterministic address resolution period.

Figure 15:
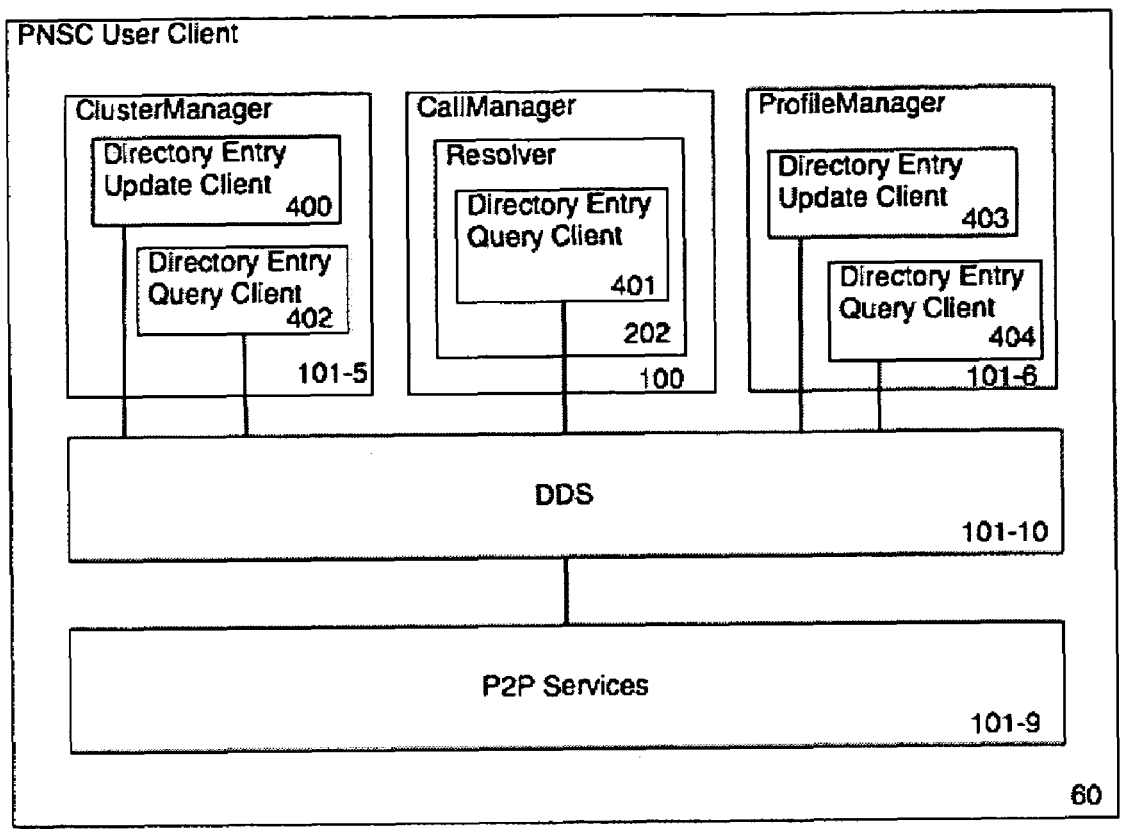
FIG. 15 illustrates a block diagram showing the relationship between directory query and update clients and their users, DDS and the P2P services layer.

In practice, this means that a caller may dial any one of several telephone numbers belonging to the recipient such as the recipient's home phone number, office phone number, mobile phone number, or contact identifier. According to one embodiment, during call setup or a call request, a resolver takes the dialed number or contact identifier, and type of network of the incoming call leg and executes a search using the directory entry query client 401 to determine a set of addresses to which the call should be delivered. The directory entry query client 402 (FIG. 15) retrieves the set of addresses by performing a query and result set retrieval from DDS 101-10. This set of addresses is returned to the call object and the call is delivered to each address in the result set, forking the call path in the case of multiple addresses. The search encompasses the user's list of contacts, other owners of the user client peer on which the resolution is executing, and endpoints on the distributed call management peer-to-peer or server-client network.

The resolver 202 will discover the network location of a number of the recipient's communications devices 14 that are enabled with similar device discovery software. The number resolver provides a search infrastructure by which general searches can be propagated. The resolver 202 uses the propagation capability of the underlying peer-to-peer or server-client network to perform the search as well as the resolution of the search to the URL of the recipient devices 14. Having done so, the resolver provides the user's call manager 100 with the Internet addresses needed to initiate calls to one or more of the recipient's devices 14. In effect, the resolver 202 enables a call in which the caller dialed any one of the recipient's known-as E.164 PSTN numbers or contact identifier instead of a series of individual IP end point addresses such as SIP URI (Session Initiation Protocol User Resource Identifier) or IP address such as 26.127.5.1:2060 associated with the recipient's communications devices 14.

In a preferred embodiment, the resolver algorithm is designed such that the resolution process for a complete call will pass through resolvers in at most two distributed call management peers. This invariant does not limit a call manager's generality with respect to conference calling scenarios, as each conference call is set up individually as a call to each participant, who is then joined to another call or conference call already set up. That is, a call itself may pass through more than two distributed call management peers but the resolution phase for any given call will preferably only occur on at most two distributed call management peers.

Figure 12:
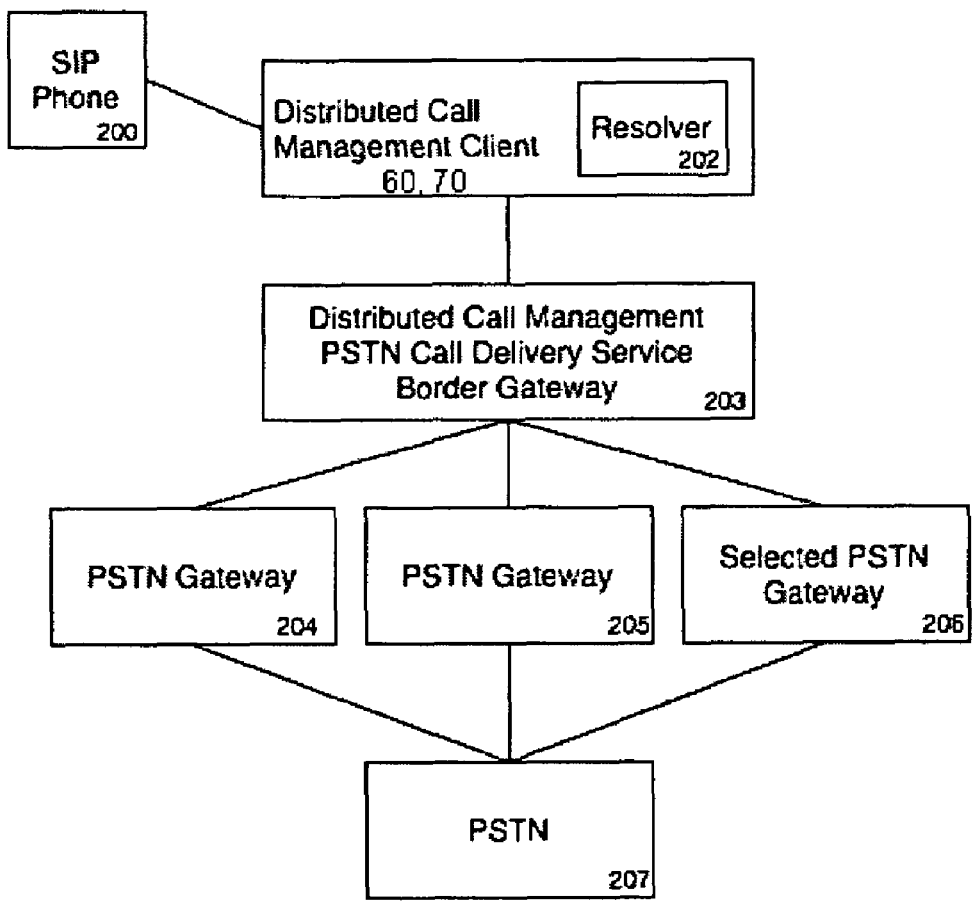
FIG. 12 illustrates a block diagram of the components involved in a resolution in an integration with PSTN.

The resolver invariant behavior can change to support alternative services. In general, this behavior may change in any case where the second resolver in the call path has more knowledge than the first resolver. Two such potential examples follow:

1. Integration with an IXC or with CLECs. Should the distributed call management application be deployed with a centralized PSTN call delivery service through integration with an IXC or with CLECs, the supporting architecture may involve resolution at more than two resolver points. As illustrated in FIG. 12, the caller may use a standard SIP phone 200 registered on their distributed call management client 60 or 70. The resolver 202 may then determine that based on the information available, the least cost route for the call is through the centralized PSTN call delivery service. The call may then proceed from Distributed Call Management Client 60 or 70 to a distributed call management PSTN call delivery service border gateway 203. This gateway 203 may then execute its own resolution, searching for the best PSTN gateway 206 out of a number of possible PSTN Gateways 204, 205, 206 from which to enter the PSTN 207.

2. Address Database. Should the distributed call management application be deployed integrated with an address database, perhaps supporting 800-service-like number database scenarios, the supporting architecture may involve resolution at more than two resolver points.

3.4.1. Resolver Algorithm

A resolver algorithm may be motivated by some or all of the following design goals: least-cost routing based on available network paths; unchanged PSTN-like dialing experience for the caller; subscriber-centric virtual identity; correct routing; and deterministic resolution time. A resolution may be performed using the following steps:

The telephone number digits or equivalent contact identifier are entered by the user via a user interface or delivered from a constrained device, perhaps with only a numeric dial pad.

The telephone number to be resolved is normalized into canonical form. The canonical form can be considered to be a "fully-qualified form" of the telephone number. For example, a local North American telephone number such as "555-1212" owned by someone living in Toronto may be normalized to "14165551212". This allows unambiguous comparisons to determine if a particular queried telephone number "matches". Note that the example normalization here is only one example of a normalization that will be performed. Depending on the form of the non-normalized number and the home location of the owner of the number, different patterns of normalization may be necessary. The resolver 202 may also take a contact identifier as input rather than a telephone number.

A resolution query request is generated and issued to the local P2P network interface or via the service gateway for transmission into the P2P or server-client network. In utilizing a peer-to-peer solution (discussed in greater detail below), the DDS 101-10 may achieve fast lookups by a distributed hash table design of the peer-to-peer network on which the DDS is implemented. The use of a distributed hash design for the peer-to-peer layer results in resolution periods that are logarithmic in the number of hosts in the peer-to-peer network. Deterministic resolution periods are achieved by setting a maximum period for the Known-As Number resolution portion to complete. At the time when this period elapses, the network resolution process is considered complete by the resolver regardless of how many, if any, resolved addresses have been retrieved from the DDS 101-10.

If the incoming call leg is a regular EP (such as SIP) end point or a FXO (or local end point) or alternate network services end point (such as SkypeOut which would be a simpler case than the FXO), steps such as those in the pseudo code of table 1 may be followed.

TABLE 1

```
CollectDialedDigits ( )
CanonicalDialedDigits = CanonicalizeDigitString (DialedDigits)
CalledUserIdList = QueryUserIdByDialedDigits ( )
if (IncomingLeg.Type is not Fxo)
{
   foreach Contact in CallingDeviceOwner.ContactList
   where Contact.UserId matches any CalledUserId in CalledUserIdList
   {
      CalledLocationIndex =
      QueryLocationIndexByUserId(Contact.UserId)
      Foreach NodeId in CalledLocationIndex
      {
         append NodeId to AddressList
      }
   }
}
foreach Owner in PcClientDevice.OwnerList
{
   foreach KnownAsNumber in Owner.KnownAsNumberList
   {
      if CanonicalDialedDigits match KnownAsNumber
      {
         foreach NodeId in Owner.OwnedDevices
         {
            append NodeId to AddressList
         }
         foreach SipUA registered on this PCClient
         {
            append SIP address to AddressList
         }
               If IsLoggedInToTerminal (Owner)
               {
                  append LocalTerminal Address to AddressList
               }
      }
   }
}
If AddressList is Empty
{
   if IsLongDistance (CanonicalDialedDigits)
   {
      foreach SharedLineLease in SharedLineLeaseList
      {
         if InDialingArea (CanonicalDialedDigits)
         {
            append NelturaSipShared Address to AddressList
            terminate foreach over SharedLineLeaseList
         }
      }
      if AddressList is empty
      {
         append Fxo Address to AddressList
      }
   }
   if not IsLongDistance (CanonicalDialedDigits)
   {
      append Fxo Address to AddressList
   }
}
// Filter Addresses:
if IncomingLeg.Type is Fxo
```

TABLE 1-continued

```
{
   remove all NelturaSipShared Addresses from AddressList
   remove all NelturaSip address from AddressList
}
remove IncomingLeg.Address (Sip or Fxo or Local) from AddressList
```

If the incoming call leg is a similar distributed call management enabled IP end point (NelturaSip), steps may be performed as illustrated by the pseudo code in Table 2.

TABLE 2

```
foreach Owner in PcClientDevice.OwnerList
{
   foreach KnownAsNumber in Owner.KnownAsNumberList
   {
      if CanonicalDialedDigits match KnownAsNumber
      {
         foreach SipUA registered on this PCClient
         {
            append SIP address to AddressList
         }
         if IsLoggedInToTerminal (Owner)
         {
            append LocalTerminal Address to AddressList
         }
      }
   }
}
assert (AddressList does not contain Fxo)
assert (AddressList does not contain NelturaSip)
assert (AddressList does not contain NelturaSipShared)
```

If the incoming call leg is a distributed call management shared resource end point (NelturaSipShared), steps the FXO address is appended to the address list.

3.4.2. Resolver Least Cost Routing

When a resolver 202 wishes to route calls based on least cost routing, in one embodiment, the revolver 202 will create a list of possible services with a weighted value associated with each one that is indicative of the costs of utilizing each service or collection of services would incur. The resolver may then order the possible services and choose the least cost routing. If there are other parameters that a user wishes to include in the resolution, the resolver may instead change the weightings for each service or ignore some altogether as the further parameters require. For example, the actual determination of the least cost route may be given by a set of ordered triples (trunk type, address, cost). The resolver may then sort the triples for available network services based on cost and select the triple with lowest cost value.

In one embodiment, the resolver may utilize a least cost heuristic to approximate the costs involved. This heuristic may be expressed as partial orderings of available trunks, for local and for long distance. One example is:

Local

Cost(IP)<Cost(FXO)

Long Distance

Cost(IP)<Cost(Shared)<Cost(FXO)

While this is one cost heuristic, it is understood that others may also be used in various embodiments. It is instructive to note also that the shared resource mechanism of this invention provides for the availability of a potentially larger number of candidate least cost routes than even clustering a user's own devices 14 may allow. The more candidate routes available for selection by the resolver algorithm, the lower the expected average cost of a call.

3.4.3. Disambiguation of Overlaps

In a peer-to-peer network, user name cloning can exist in the network address space. To enforce correctness in user identity resolution, without access to cloned network authentication, the resolver 202 needs to reconcile two seemingly conflict requirements:

- operating completely independent of the cloned network operator (eg: PSTN/telephony core network operators), who are (via delegation by national and international telecom authorities) the authoritative source of network numbering assignments and routing information; and
- providing complete dialing transparency to the calling user, ie: to require no changes to dialing behavior, no use of an alternate number or other form of address in order to start a session to a contact.

In one embodiment, these conflicting requirements are resolved by defining a set of procedures by which a user may make a claim that they are contactable at a particular E.164 number. In the design, a number for which a user makes this claim is called a "Known-As Number". By allowing users to make claims that they are known as a particular E.164 number, the application becomes vulnerable to the possibility of users claiming to be contactable at numbers which they are not actually contactable. In order to make the solution robust against such abuse, the design define a general validation procedure. A user's claim to a particular Known-As Number is considered validated if, after contacting.

Below is a general procedure which may be implemented in multiple ways:

1. Define the following:
   A: A Known-As Number
   O(A): The rightful owner of A (a user for whom a claim to be contactable at A is true.
   M(A): A user making a false claim to be contactable at A
   C: Calling user
2. Validation procedure
   C calls a user B claiming to be contactable at A on the PSTN.
   B accepts the connection.
   B provides proof of identity over the channel between A and B.
   C validates B's identity.
   C records
   A answers
   C recognizes A

3.4.4. Shared Resource Usage

Communications services such as PSTN associated with a FXO line resource, or VoIP services such as SkypeOut can be shared amongst a user's cluster of devices 14, and extended and shared with the user's contacts. Service sharing is automatic amongst the user's cluster of devices. For example, a call initiated from the user's laptop computer can be placed through the user's FXO home line via the user's home computer. Similarly, an incoming call to the user's Skype account can be connected to the user's mobile phone via the user's SkypeOut service.

Service sharing amongst users is accomplished in a preferred embodiment through the extension of a resource lease from the "owner" of the service resource to the lessor of the resource. From the resource control panel, the user "A" which owns a specific service such as home PSTN line or SkypeOut can extend the resource to user "B". The service offer or permission extended by user "A" can come with a set of service permissions such as specific calling number or dialing pattern, time of day, duration of call, etc.

Since user "B" is on user "A's" contact list, user B receives the extension of the service lease via one or more of user B's devices 14. User B is then notified of the availability of the service resource extended by user A, such as via the UI of client 60 running on a device 14 in user B's cluster. The service resource from user A can then be added to user B's set of available service resources, and making it accessible to user B's cluster of devices. The lease of the service resource from user A can be revoked at any time by user A. User B also has the option to remove the shared service resource from user A by removing it from user B's resource control panel. Removal of the shared resource is done through simple deletion of the associated shared resource lease document.

An example of a shared resource lease document is found in Table 3.

TABLE 3

```
<?xml version="1.0" encoding="UTF-8"?>
<sharedResourceLease>
    <resource id="uuid:093a2da1-q345-739r-ba5d-pqff98fe8j7d"/>
    <device id="uuid:509c5a00-712a-11da-8cd6-0800200c9a66"/>
    <lessorUser>cquon</lessorUser>
    <lesseeUser>jsong</lesseeUser>
    <leaseStart>Thu Sep 30 22:09:46 GMT 2004</leaseStart>
    <leaseDuration>86400</leaseDuration>
    <dialPattern type="simple">1604275XXXX</dialPattern>
    <dialPattern type="simple">1778XXXXXXX</dialPattern>
</sharedResourceLease>
```

In this example, the resource ID value is an instance of a UUID as defined in RFC 4122. The lessorUser value is the ID of the user extending the lease. The lesseeUser value is the ID of the user receiving the lease. The leaseStart value is a timestamp denoting the time of issue of the shared lease. The leaseDuration denotes the valid period of the lease in seconds. The dialPattern is a dial string pattern specifier allowing for multiple expression schemes. At this point in time there is one such scheme defined, type "simple." Dial patterns of this type may be composed only of dialed digits and the character "X," denoting a wildcard matching any dialed digit. Future schemes may support more powerful expression forms such as regular expressions.

Both shared resource lease documents extended by a given client and those received by a given client are stored by the resource manager 101-7 (FIG. 6). A user "B" attempting to make use of a lease extended by user "A" executes the following steps:

1. Locate the device hosting the shared resource via the device's index in DDS.
2. Authenticate themselves to the device in user "A"'s cluster which hosts the shared resource.
3. Initiate a shared call leg to the resource identifier at the device via the use of a Shared Half Call object.

When a user A allows another user B to make use of a lease extended previously by user A, the following steps may be executed:

1. Authenticate user B.
2. Receive user B's shared resource session initiation request.
3. Check user "B's" request against the list of previously extended leases stored by ResourceManager.
4. Allow or disallow the session initiation request based on whether the request meets the conditions of a previously extended lease.
5. Receive the incoming call leg signaling via a terminating shared half call.

3.5. Media Control

In one embodiment, media control object 100-2 of distributed call management 90, 100 may be based on the "Mediator" design pattern. In at least some embodiments, there are generally three different objects, along with the media control object 100-2, that interact to set up and tear down media connections. For each of the call management objects 81, 84, 86, there are corresponding run time media control instances in the media control subsystem 100-2. Through specialization of the half call objects such as 81, 84, 86 controlled by the call management object 82 in the call manager 100, any call session can be routed, and media can be switched from one media port to another media port within the same user device 14, to or from another device, or to or from a service network via the service gateway 50 within the service cluster.

The media objects are: FXO object 380 which is an instance of line interface 151, FXO instance 385 which is a run-time instance of the media engine 108-1, and local instance 387 which is another run-time instance of the media engine 108-1 (See FIGS. 7-10). Other variants of the design can include other PSTN objects such as PRI instead of FXO and other variants of EP instead of SIP such as Skype API. Note that core components 388 are made up of the components of client application 60 or 70 itself including the call manager 100 and media control 100-2, except for the specific components as labeled: FXO object 380, FXO instance 385, local instance 387, and transport broker 103. One important design goal of the media control subsystem is to present the illusion of a half-call based media engine to the half-call based call control components including the call manager 100. The actual media engine, which may be a subcomponent of the media control subsystem, may not in fact be based on a half-call design.

Media control subsystem 100-2 of one embodiment consists of a number of functional elements. In reference to FIGS. 8-11, media engine 108-1 is preferably a software component running on standard processing devices to provide audio processing. Core components 388 then interact with instances 385 and 387 of the media engine 108-1, FXO object 380, and external systems typically through the transport broker 103. FIGS. 8-11 illustrate four audio transmissions in which core components 388 and media engine 108-1 are involved in routing and/or processing the audio streams.

Figure 8:
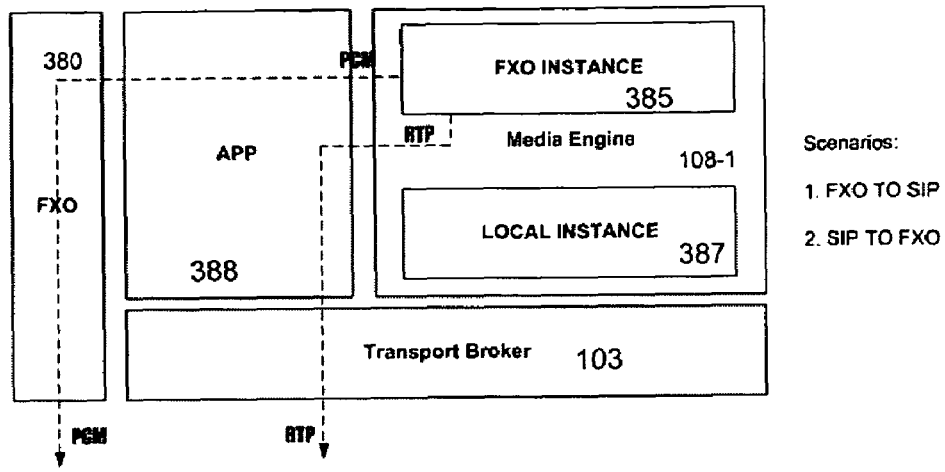
FIG. 8 illustrates a block diagram showing an example of call routing between an FXO-based service and IP-based service.

In an embodiment, FXO object 380 accepts and outputs Pulse Code Modulated audio data (PCM) between an external FXO network and core components 388. In FIG. 8, audio data is passed from an FXO network to an SIP network, such as VoIP networks. FXO object 380 passes PCM audio data through the core components 388 to media engine 108-1. While there, media engine 108-1 utilizes a run time FXO instance 385 to convert PCM audio data to RTP data. This RTP data is then routed through transport broker 103 to an SIP network. One example of such an interaction may occur with the use of a PC and an equipped voice modem translating audio data between PCM and RTP data.

Figure 9:
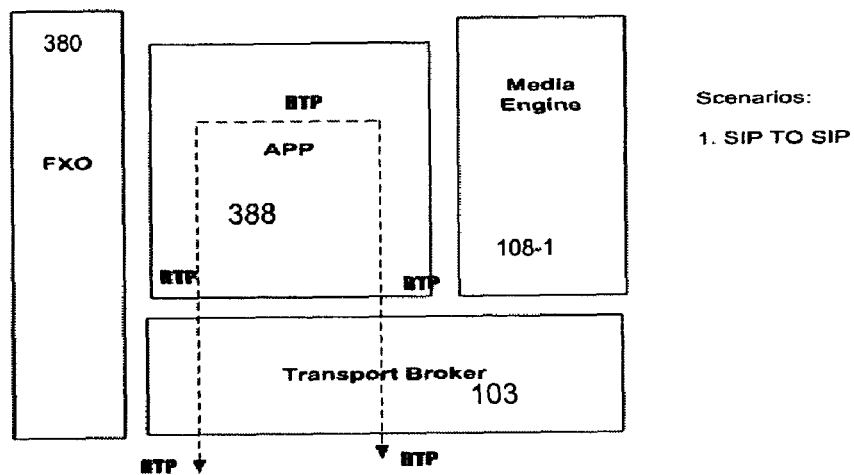
FIG. 9 illustrates a block diagram showing an example of call routing between two devices utilizing services under the same protocol.
Figure 10:
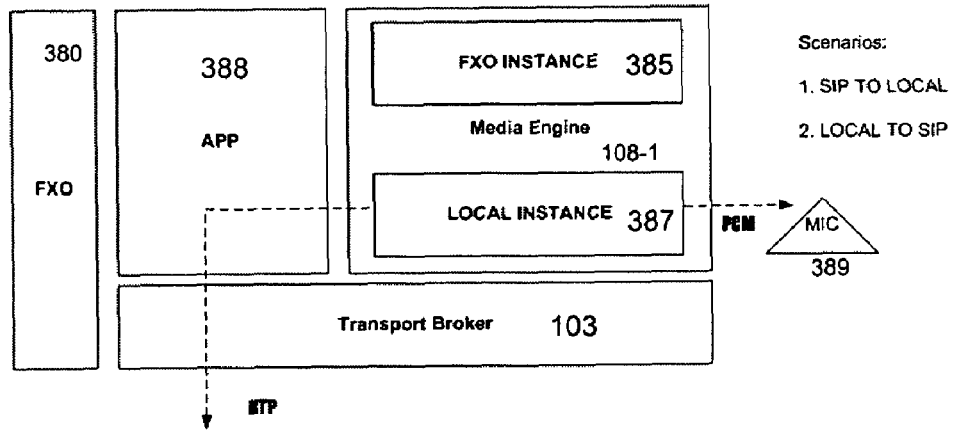
FIG. 10 illustrates a block diagram showing a routing from a local device, such as a microphone, to an internet based service.

Another interaction is shown in FIG. 9. In this case, the network routing does not require translation of the data type, because, for example, both input and output networks utilize the same protocol. FIG. 10 illustrates audio that is routed from a local object, such as a microphone 389 attached to a PC, out over an SIP network. In an embodiment, PCM audio from the microphone 389 is translated by a local runtime instance 387 of the media engine 108-1 for the local trunk interface into an RTP signal. This signal is routed through transport broker 103 out over the proper network.

Figure 11:
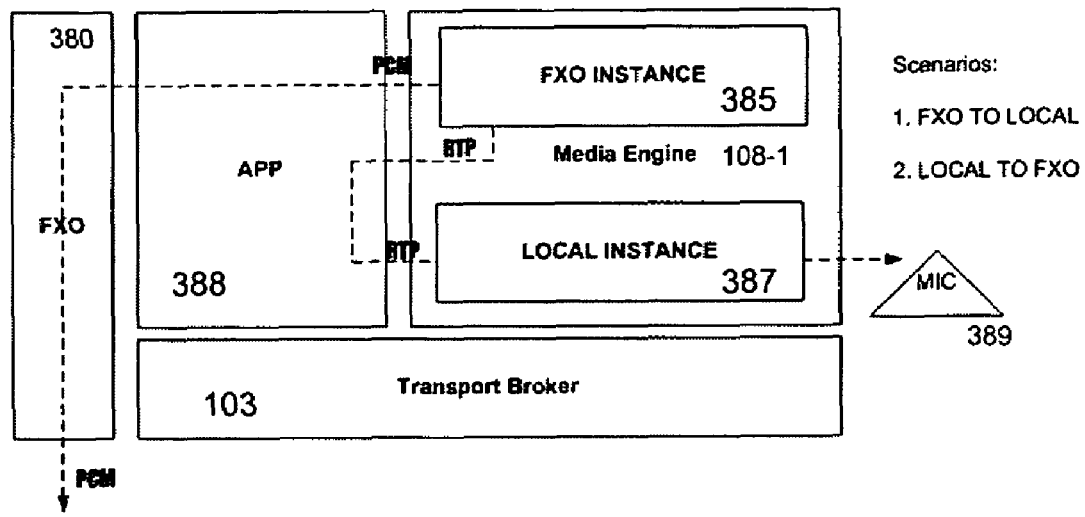
FIG. 11 illustrates a block diagram showing a routing from a local device through an FXO based service, such as a home phone line.

Finally, FIG. 11 illustrates what may happen if the call routing utilizes, for example, a PC with a voice modem but the local phone service is utilized to connect a call. In such a case, audio data from the microphone 389 is translated by local instance 387 of media engine 108-1 from PCM data to RTP data, the RTP data is then routed through core components 388 as needed. The RTP data is then translated back into PCM data by FXO instance for FXO object 380 to route it over the PSTN network.

For each call management object 81, 84, 86, there is a corresponding media control object instance within media control subsystem 100-2. The media control object instance within media control 100-2 interacts with the associated media line interface FXO 380, FXO instance 385, and local instance 387. For instance, the FXO half call management object 81 would provide call management of a FXO media control object instance in 100-2, which in turn controls the media on the FXO line interface 380.

The call manager initializes the mediator design pattern upon startup of the application and receives a "handle" to the media control object 100-2. Any further communication with the media control object 100-2 is done using that "handle." The call manager interacts with the media control object 100-2 to setup and teardown media streams. Once the media control object 100-2 receives a setup or teardown request from the call manger 100, it will initiate the correct sequence of operations from the call control objects Local/FXO/SIP objects 86, 81, 84, to the corresponding media control instances in media control subsystem 100-2 in order to service the request from the call manager.

The FXO object 380 as an instance of the line interface 151 is responsible for sending/receiving media from the PSTN. See FIGS. 8, 6. The media coming from the PSTN is received by line interface 151, passed to the FXO object 380 and then fed into the media engine 108-1 through media control object 100-2. If the user is not in a conference, the media engine 108-1 will play the media to the user's local media 152 or other device as configured by the user. If the user is in a conference, the media engine 108-1 may play the media to the user's local media 152 if the user is not on hold, and also to all the other parties that are in a conference. The other parties may be, for example, SIP hard phones or other distributed call management clients 60. The media generated by the user (i.e. by speaking into the microphone 389 or other external recording device) is captured by the media engine 108-1, passed to media control object 100-2 and then to the FXO object 380, which is then relayed to the PSTN using line interface 151 or via network resources such as SkypeOut via the SkypeAPI or equivalent network service control interface. If the user is in a conference, it is possible that the user might not speak anything at all into the microphone 389 or other external recording device. In this case, media being received from other parties is mixed by media engine 108-1, and then passed to the FXO object through media control object 100-2, which is then relayed to the PSTN using line interface 151.

The SIP media object in media control object 100-2 is used to send and receive media from SIP hard phones or other distributed call management clients 60. The media is received by one of the SIP objects 84 in media control object 100-2, and passed to the media engine 108-1, to be played out to the user's local media 152 or other output device as configured by the user. If the user is in a conference, the received media is mixed by the media engine 108-1, and sent to all the other parties as well as gets played out locally to the user's local media 152 such as a sound card. The local media generated by the user (such as from microphone 389 or other external recording device) is captured by the media engine 108-1, passed to one of the SIP objects in media control 100-2, which determines where the media needs to be sent (i.e. IP Address and port), and then gets relayed to the appropriate SIP client. See FIGS. 10, 8. Also, if the user is in a conference, the media is mixed by the media engine 108-1, and sent to all the other parties in a conference. The media may be sent using RTP (Real Time protocol) over the UDP (User Datagram Protocol) transport protocol. Call manager 100 interacts with this object directly only when it needs to set remote SDP or retrieve local SDP.

The local media object instance in media control object 100-2 maintains user side media and control. Any media coming from FXO or SIP object instance in the media control object 100-2 is passed to the local object of the media control object 100-2 before it is passed to the media engine 108-1.

Every half call has a media object associated with it. The only time when a local media object in the media control object 100-2 might.not participate in a call is when the user is in a conference and the user puts the call on hold. In this case, the media coming from FXO or SIP media objects in 100-2 is not passed to the local object in media control 100-2, rather it is passed directly to the media engine 108-1 from those objects, which gets mixed and gets sent to all the parties in the conference. In the case of local media generated from user (such as from microphone 389) the media engine 108-1 passes the media to the local media object in the media control object 100-2 first (if local is not in conference), which finds the appropriate receiver object (i.e. FXO or SIP) for that media. The call manager interacts with this object directly only when the call needs to be put on hold.

3.6. Profile Manager

The profile manager component 101-6 provides a user account profile configuration synchronization service to the other components of the distributed call management client 60. Various distributed call management client components maintain configuration information properly owned not by any given client device 60 or an instance of a user on such a device, but rather by the user's network wide persona or account. Profile manager 101-6 acts as a network-synchronized persistent data store for such information. Profile manager 101-6 makes a best attempt to maintain synchronization between copies of the user's account profile on all devices 14 owned by the user.

Typical User Account Profile Content

The user account configuration profile information is known as the user's private profile. Examples of information stored in the Private profile in some embodiments include: known-as numbers; contacts/buddy lists; shared-line leases given; shared-line leases received; a private key; and/or a signing key.

Synchronization Procedures a. Local Changes to Private profile

When a consumer of profile manager 101-6 updates its configuration, and commits the change, profile manager 101-6 will preferably find and contact all other distributed call management clients 60 owned by the same user account and send the updates to the private profile on those clients as well. If one or more of the user clients 60 owned by the user account cannot be contacted when the synchronization attempt is made, whether due to those clients being offline or due to network failure, then a private profile change transaction may be inserted into the DDS 101-10 via the directory entry update client 403. The private profile change transaction will contain markers showing which clients owned by the user account have or have not synchronized the private profile change. Placing the private profile change transaction in the DDS 101-10 allows nodes to receive updates whether or not they are connected at the time the update is made. Furthermore, the node that initiated the update does not need to be online when other nodes wish to make the update that was initiated. Even if all nodes in the synchronization set—i.e. those nodes that typically maintain the copies of the private profile record-are down, as long as at least one node is available the DDS 101-10 should be available with the necessary update information.

b. Remote Changes to Private profile

When profile manager 101-6 is contacted by another user client 60 providing a private profile update, the local profile manager 101-6 will accept the update and notify the local components registered as profile manager service consumers of the update to their XML-serialized configuration data.

c. Client Log

On user client 60 startup, once the client has successfully logged on to the network, profile manager 101-6 may use the directory entry query client 404 to initiate a search for any private profile change transaction that may have been stored in the DDS 101-10 and retrieve any result records from the DDS 101-10. If a private profile change transaction is found and it has not already been applied to this user client 60, the client will first apply the private profile change transaction. The client will then use the directory entry update client 403 to update the private profile change transaction record in DDS 101-10, marking the record to indicate that the retrieving user client (60) has applied the private profile change transaction.

Profile Manager Service Consumer Behavior

Consumers of profile manager 101-6's synchronized persistence service may be responsible for: registering their name with the profile manager; accepting asynchronous updates to their XML-serialized configuration data at runtime; providing any XML-serialized configuration data they wish to reside in the Private profile; and minimizing the number of updates to their XML-serialized configuration data to prevent an unnecessarily high rate of synchronization operations. See Table 4 for an example of how a coded profile may look if XML is utilized.

TABLE 4

```
<?xml version="1.0" encoding="utf-8"?>
<PrivateUserProfile>
    <UserId>dstn</UserId>
    <TimestampLastUpdated></TimestampLastUpdated>
    <ApplicationData>
        <ContactManager>
        <![CDATA[
            <ContactList>
                <Contact id="johndoe1">
                    <DisplayName>John Doe 1</DisplayName>
                    <FirstName>John</FirstName>
                    <LastName>Doe 1</LastName>
                    <Email>johndoe1@neltura.com</Email>
                </Contact>
                <Contact id="johndoe2">
                    <DisplayName>John Doe 2</DisplayName>
                    <FirstName >John</ FirstName>
                    <LastName>Doe 2</LastName>
                    <Email>johndoe2@neltura.com</Email>
                </Contact>
                <Contact id="johndoe3">
                    <DisplayName>John Doe 3</DisplayName>
                    <FirstName >John</FirstName>
                    <LastName>Doe 3</LastNatne>
                    <Email>johndoe3@neltura.com</Email>
                </Contact>
            </ContactList>
        ]]>
        </ContactManager>
        <CallManager>
        <![CDATA[
            <UserInformation>
                <KnownAsNumberList>
                    <KnownAsNumber>16045551212</KnownAsNumber>
                    <KnownAsNumber>16045551313</KnownAsNumber>
                </KnownAsNumberList>
                <CountryCode>1</CountryCode>
                <AreaCode>604</AreaCode>
            </UserInformation>
```

TABLE 4-continued

```
        ]]>
        </CallManager>
        <MessagingManager>
        <![CDATA[
          <Configurables>
          </Configurables>
        ]]>
        </MessagingManager>
    </ApplicationData>
</PrivateUserProfile>
```

3.7. Presence Manager

Presence manager 101-3 (FIG. 6) is a component of distributed call management client 60 and provides rich presence information to other components of user client 60 or external applications through Web Services. Preferably presence manager 101-3 is implemented through software, but it may also be accomplished through hard coded hardware implementations or the like. Presence manager 101-3 of a user client 60 node propagates the presence information of the user or the user's devices 14 collected from the node to the other nodes belonging to the same user (designated as cluster nodes) so that all cluster nodes have the same presence view of the user. It also propagates an aggregated view of the collected presence information to all nodes of the contacts on the user's buddies list which have registered for receiving the notification of presence status. The type of aggregated presence (e.g. aggregated person status, aggregated service status etc.) which the contact nodes can receive may be determined by policies specified by a user for privacy protection.

3.7.1. Algorithm

The presence manager 101-3 of each user client node 60 is responsible for receiving presence status and performing aggregation and propagation of presence status to the other registered nodes. The logical steps of each of these tasks are described below:

a. Registration for Receiving Notification of Presence Status

When a user logs onto a user client node 60, the presence manager 101-3 of this node sends a REGISTRATION request to all nodes of the contacts' clusters. The presence manager 101-3 will receive either an "accepted" or "denied" response from each of the contact nodes depending on whether the contact allows the requestor to view the contact's presence. The presence manager(s) of the nodes which received a REGISTRATION request and returned with an "accepted" response will add the requester ID to the presence notification list.

b. Cancellation of Registration for Receiving Notification of Presence Status

When a user logs off from a user client node 60 and if this node is the only node in the user cluster, the presence manager 101-3 of this node sends a CANCELLATION request to all nodes of the contacts' clusters. The presence managers 101-3 of the nodes which received a CANCELLATION request will remove the requestor ID from the presence notification list.

c. Propagation of Presence Status

When the presence manager 101-3 of a node receives a PRESENCE message from some component of the node (e.g. phone status from the call manager 100, or person status from GUI 60), it retrieves the list of user cluster nodes from the local cluster manager 101-5. Presence manager 101-3 propagates the original PRESENCE message to each of the user cluster nodes. For each of the contacts on the presence notification list, the presence manager 101-3 retrieves the list of contact cluster nodes from the local cluster manager 101-5 and sends the aggregated presence to the contact node based on the filtering policy.

d. Aggregation of Presence Status

When the presence manager 101-3 of a node receives a PRESENCE message from some component of the node or from another node of the same cluster, it performs aggregation of the presence status. For example, the status of a voice service is changed from available to unavailable if all the phone devices associated with the voice service became all in-use. The presence manager 101-3 then stores the aggregated presence status in its presence cache. The PRESENCE message which is received from any nodes of other clusters is preferably an aggregated presence. In this case, the Presence Manager does not need to perform any aggregation. It simply stores the received presence in its presence cache.

3.7.2. Communication Protocol

The presence manager 101-3 of a node may communicate with the presence manager 101-3 of another node by sending messages in XML format through transport broker 103. There are generally three types of messages that should be supported, but others may be implemented in various embodiments. The three preferred message types are: REGISTRATION Request/Response message; CANCELLATION Request Message; and PRESENCE Message (based on IETF's standards Rich Presence Extensions to the PIDF). No acknowledgement response is expected from the recipients of the CANCELLATION Request Message or the PRESENCE messages. Examples of these messages are shown in Table 5.

TABLE 5

```
REGISTRATION Request Message
<?xml version="1.0" encoding="UTF-8"?>
    <PresenceRegistrationRequest xmlns=
    "urn:Neltura:PresenceManager:v1">
        <sender>francis@neltura.com</sender>
        <action>register</action>
    </PresenceRegistrationRequest>
REGISTRATION Response Message
<?xml version="1.0" encoding="UTF-8"?>
    <PresenceRegistrationResponse xmlns=
    "urn:Neltura:PresenceManager:v1">
        <sender>jessica@yahoo.com</sender>
        <result>accepted</result>
    </PresenceRegistrationResponse>
CANCELLATION Request Message
<?xml version="1.0" encoding="UTF-8"?>
    <PresenceRegistrationRequest xmlns=
    "urn:Neltura:PresenceManager:v1">
        <sender>francis@neltura.com</sender>
        <action>cancel</action>
    </PresenceRegistrationRequest>
PRESENCE Message
<?xml version="1.0" encoding="UTF-8"?>
    <presence xmlns="urn:ietf:params:xml:ns:pidf"
        entity="sip:francis@neltura.com">
        <!-- Service #1 -->
        <tuple id="sg89ae" testid="test123">
            <status>
                <basic>closed</basic>
            </status>
            <device-id>urn:esn:600b40c7</device-id>
            <servcaps>
                <methods>
                    <method>INVITE</method>
                    <method>OPTIONS</method>
                    <method>BYE</method>
                    <method>ACK</method>
                    <method>CANCEL</method>
                </methods>
                <audio>true</audio>
                <duplex>half</duplex>
            </servcaps>
```

TABLE 5-continued

```
        <contact>sip:gruu-aa@example.com</contact>
    </tuple>
    <!-- Service #2 -->
    <tuple id="sg90ae">
        <status>
            <basic>open</basic>
        </status>
        <device-id>urn:esn:888900lbb</device-id>
        <contact>sms:1234567</contact>
    </tuple>
    <person>
        <status>
            <activities>
                <activity>on-the-phone</activity>
                <activity>busy</activity>
            </activities>
        </status>
    </person>
    <!-- Device #1 -->
    <device id="urn:esn:600b40c7">
        <status>
            <basic>closed</basic>
        </status>
        <devcaps>
            <mobility>fixed</mobility>
            <phone>true</phone>
        </devcaps>
    </device>
    <!-- Device #2 -->
    <device id="urn:esn:8889001bb">
        <status>
            <basic>open</basic>
        </status>
        <devcaps>
            <mobility>mobile</mobility>
            <phone>true</phone>
        </devcaps>
    </device>
</presence>
```

The presence manager 101-3 also preferably provides an API to allow other software components of user client 60 to accomplish various functions, such as, for example, adding or removing a contact; registering to receive presence status; retrieving specific presence types; and/or sending presence to the presence manager.

3.7.3. Example Use Cases

There are a number of possible interactions between the presence manager 101-3 and other portions of its user client 60 or other user clients 60. The following are examples and are not meant to be limited.

3.7.3.1.Registration for Receiving Notification of Presence Status

This may be triggered by user logon. After the user logs on to the distributed call management network, the user client 60 registers for receiving notification of presence status event in each of the user's other user clients 60 and in each of contacts on the buddy list who are online. Generally this may be accomplished by having a user logging on to the distributed call management network from a user client 60. The user client 60 sends a presence registration request to each of the user's other user clients 60, 70. The user client receives a presence registration response from each of the user's other user clients 60, 70. The user client 60 sends a presence registration request to each of the master user clients 60 of the contacts on the buddy list who are online and receives a presence registration response from the master user client of the contacts on the buddy list who are online. The request is rejected if the user is not allowed to receive the presence status of the contact. The master user client of the contacts notifies its slave user clients of the changes in the registration list. This enables the switching over of the master role to any one of the slave user clients in case of master user client failure.

A similar event may also be triggered by contact logon. When a contact on the buddy list of a user logs on to the distributed call management network, the user's client 60 will receive notification of the logon from the contact's other distributed call management clients 60. Generally, a contact of the buddy list of the user logs on to the distributed call management network. The user client 60 receives notification of the contact logon event and sends a presence registration request to the contact's master user client. The user client receives a presence registration response from the contact's master user client. The request is rejected if the user is not allowed to the presence status of the contact. The master user client of the contacts notifies their slave user clients of the changes in the registration list 3.7.3.2.Cancellation of Registration for Receiving Notification of Presence Status When a user logs off from the distributed call management network, the user's client 60 will cancel the registration for receiving notification of presence status in each of the user's other user clients and in each of contacts on the buddy list who are online. After a user logs off from distributed call management network, the user client 60 sends a request to each of the user's other user clients 60 and gateways 50 for cancellation of the notification of presence status. The user client 60 also sends a cancel request to each of the master user client of the contacts on the buddy list who have been registered for receiving notification of presence status. The master user client of each contact notifies its slave user clients of the changes in the registration list. Optionally, there may also be a notification of presence status change admitted.

3.7.3.3 Notification of Presence Status Change

A change in device status may also trigger a cancellation. The presence manager 101-3 will send a presence message to the user client 60 and each master user client of the contacts which have registered for receiving notification of the presence status when there is a change in the device status (e.g. a phone line changed its status from on-hook to off-hook). Generally, when a status of a user device changes, the presence manager 101-3 of the user client 60 associated with the device gets notified. The presence manager may then construct a presence message with the updated device status. The presence manager sends the presence message to each of the user clients and the master user client of the contacts which has registered for receiving notification of the presence status. The master user clients of the contacts update their slave user clients of the changes in the presence status.

Further, similar events may be triggered by a change in user preferences or by other applications. In such cases, the presence manager 101-3 will send a presence message to the user client 60 and each master user client of the contacts which have registered for receiving notification of the presence status when there is a change in the settings of user preference (e.g. the user changed the Do-Not-Disturbed setting from disabled to enabled). Generally, the user changes the preference using user client GUI 106, or the user performs a task which triggers the status change in an application. The presence manager 101-3 of the user client associated with the device gets notified. The presence manager 101-3 constructs a presence message with the updated user preference or application changes and sends the presence message to each of the user clients which has registered for receiving notification of the presence status. The master user client of each contact updates its slave user clients of the changes in the presence status.

3.7.3.4. Propagation of Presence Status to Applications

When a presence manager 101-3 receives a presence message from the other user clients, it will propagate the presence status to the applications which have registered for receiving the presence status (e.g. user client GUI). Generally this occurs by the presence manager 101-3 receiving a presence message from another user client 60. The presence manager extracts the presence information from the message and performs aggregation of the status as described below in Use Case "aggregation of presence status." The presence manager notifies the registered applications of the new presence status.

3.7.3.5. Aggregation of Presence Status

A presence manager 101-3 may perform an aggregation of presence status to consolidate the presence status of both the user and the associated contacts for easy access by other components of the node (e.g. GUI, web services). This may be initiated when the presence manager 101-3 receives a presence message from another user client 60. The presence manager extracts the presence information from the message. The presence manager stores the presence information in its cache. The data model is designed to facilitate the easy retrieval of the data by other components. The presence manager determines a status representation for the user based on the various presence data from the user's clients (60).

3.8. Contact Manager

Contact manager 101-1 (FIG. 6) provides a mechanism for adding, deleting, and updating the contacts in the contact list and gives descriptive information for a contact, such as, for example, pictures, a display name, email address, phone numbers, and the like. In addition, it may provide a mechanism to search for a contact in the distributed call management network. In some embodiments, the contact manager 101-1 preferably can import contacts from email and instant massaging applications or networks such as MS Outlook, Skype, and Yahoo! Instant Messenger.

3.9. Transport Broker

Transport broker 103 (FIG. 6) handles the details of sending messages among nodes in the distributed call management network and to other IP devices. It preferably provides a higher-level interface so that other components operate at the level of sending and receiving messages, rather than at the level of IP stacks, network sockets, port numbers, firewalls, network address translation (NAT) devices, and so on. Transport broker 103 also provides additional services such as fragmentation and reassembly of large messages, and guaranteed message delivery. Finally, the transport broker provides a routing system that allows messages to be delivered to particular components of the disclosed system. This makes message processing much more simple and efficient.

In addition, the transport broker 103 is preferably stackable. That is, incoming and outgoing messages traverse a series of filters that can modify the message in many ways. This allows, for example, compression, encryption, and logging of messages in a simple way that is transparent to other components. Because the transport broker 103 provides a high-level interface, the underlying implementation details can be changed without any changes to other components. In one embodiment, the transport broker uses UDP/IP as its primary message delivery medium.

3.10. Distributed Data Store

The distributed data store (DDS) component 101-10 (FIGS. 6 and 15) preferably provides a distributed, redundant database. In the preferred embodiment, each user becomes a member of this database, sharing the load of storing database records. The software interface of the DDS 101-10 is very much like that of an asynchronous database which allows keys to be mapped to records. Keys are globally unique, and the records are arbitrary chunks of binary data. The key determines on which nodes the record will be stored. The DDS 101-10, per se, does not impose any structure on the records stored. It should be noted that this is not the only way to implement a database that would satisfy the purposes of this invention; traditional server-client architecture may also be used.

In a preferred embodiment utilizing a DDS, the DDS 101-10 has automatic redundancy, because the network connectivity between devices and the service proxy may be sporadic at times, with non-overlapping periods of connectivity. This can be especially true in a peer-to-peer network. In one embodiment, this redundancy is provided by having multiple nodes storing the same data. If a node disappears from the network, a new node will be recruited to store records the previous node was storing, the new node receiving the data from the alternate nodes storing the same information. To help prevent data loss, the nodes chosen to store a given record are preferably well separated geographically, making it more unlikely that all the nodes storing a given record will disappear simultaneously.

In order to allow application-specific processing of records, the DDS 101-10 has the concept of update policies. Each record has associated with it a record type. When a node attempts to store a record, or update an existing record, the DDS finds the update policy (Policy) corresponding to the record type. The Policy determines whether the update is allowed to proceed, and what the result of the update will be. Policies could, for example, authenticate updates using a shared-secret or public-key cryptography system, or append the new record to a bounded queue of recent record updates.

3.11. Peer-to-Peer Services

A number of peer-to-peer internetworking techniques such as Sun's JXTA, gnutella, FastTrack, CHORD, and Pastry can be used to implement peer-to-peer communications between the user clients. Many of these design architectures and protocols are well suited for non-time sensitive applications such as file sharing networks. However, time sensitive applications such as communications and presence propagation ideally utilize peer-to-peer services that are highly scalable, have network fault tolerant characteristics to support high service availability, and have deterministic behaviors such that the service application can be delivered with user predictable system response time.

In one embodiment, the peer-to-peer (P2P) services layer 101-9 (FIGS. 6 and 15) is based on Pastry. Pastry is a generic, scalable and efficient substrate for peer-to-peer applications. Pastry nodes form a decentralized, self-organizing and fault-tolerant overlay network within the Internet. Pastry provides efficient request routing, deterministic object location, and load balancing in an application-independent manner. Furthermore, Pastry provides mechanisms that support and facilitate application-specific object replication, caching, and fault recovery.

Pastry provides the following capabilities. First, each node in the Pastry network has a unique, uniform random identifier (nodeId) in a circular 128-bit identifier space. When presented with a message and a numeric 128-bit key, a Pastry node efficiently routes the message to the node with a nodeId that is numerically closest to the key, among generally all currently live Pastry nodes. The expected number of forwarding steps in the Pastry overlay network is $O(\log N)$, while the size of the routing table maintained in each Pastry node is only $O(\log N)$ in size (where N is the number of live Pastry nodes in the overlay network). At each Pastry node along the route that a message takes, the application is notified and may perform application-specific computations related to the message.

Second, each Pastry node keeps track of its L immediate neighbors in the nodeId space (called the leaf set), and notifies applications of new node arrivals, node failures and node recoveries within the leaf set. Third, Pastry takes into account locality (proximity) in the underlying Internet; it seeks to minimize the distance messages travel, according to a scalar proximity metric like the ping delay. Pastry is completely decentralized, scalable, and self-organizing; it automatically adapts to the arrival, departure and failure of nodes.

Further to the description of Pastry peer-to-peer network procedures provided here, please reference the publication "Pastry: Scalable, decentralized object location and routing for large-scale peer-to-peer systems", by Antony Rowstron and Peter Druschel, the disclosure of which is hereby incorporated by reference.

3.12. Cluster Service Management

Each device 14 in a user's cluster may serve as a distributed call management node. Cluster manager 101-5 (FIG. 6) is responsible for keeping track of nodes in clusters and their location information such as node address and geographic location. The application modules (such as presence manager 101-3, instant messenger 101-2, etc.) can make enquiry for the address of all nodes in a cluster specific to a distributed call management user through the cluster manager 101-5.

The clustering service can be realized in a number of ways, including but not limited to the following:

1. P2P clustering: Cluster Manager 101-5 maintains a list of user devices 14 which are bound to the user identity of the device owner and maintains a list of devices 14 for each of the contacts in the device owner's buddy list. Each list is bound to the corresponding contact identity. Cluster Manager 101-5 keeps track of the network addresses of the devices 14 using distributed data store (location index). The address of active devices 14 given an identity can be retrieved from the Cluster Manager or the DDS 101-10.

2. Clustering with Core Network such as through the service gateway 50: Cluster Manager 101-5 binds the user identity in various service domains (such as, for example, MSN, Google, and Yahoo!) to a single identity. Cluster manager 101-5 keeps track of the network addresses of the devices 14 using a centralized data store.

3.12.1. Example Algorithm

The location information of all nodes in both a user's cluster and his/her contacts' clusters are cached in the cluster manager 101-5 in each node. One example of an algorithm that may be used to synchronize the cache with the network is as follows:

a. Joining the user's cluster

After a node successfully joins the peer-to-peer network, the cluster manager 101-5 running on that node uses the directory entry query client 402 to retrieve the location index record of the user's cluster from Distributed Data Store 101-10. If the location index record does not exist, this node is the first node joining the cluster, and the cluster manager 101-5 puts the node location information in a new location index record and uses the directory entry update client to store it to the DDS 101-10. Otherwise cluster manager 101-5 adds the node location information to the retrieved location index record and uses the directory entry update client to store it back to the DDS 101-10 and sends a JOIN notification (including the node location information) to the other nodes of the cluster. It may also send a JOIN notification to each node of all of the user's contacts.

b. Leaving the user's cluster

Before a node leaves the peer-to-peer network, the cluster manager 101-5 running on this node uses the directory entry query client 402 to retrieve the location index record of the user's cluster from DDS 101-10, removes itself from the location index record, and uses the directory entry update client 400 to store the modified location index record back to DSS 101-10. A LEAVE notification may also be sent to the other nodes of the cluster and to each node of all the user's contacts.

3.12.2. Example Communication Protocol

In one embodiment, the cluster manager 101-5 of a node communicates with the cluster manager 101-5 of another node by sending messages in XML format through transport broker 103 (FIG. 6). In a preferred embodiment, there are generally two types of messages, namely the JOIN Notification message and LEAVE Notification message. No acknowledgement response is expected from the recipients of these notification messages. Examples of these messages are shown in Table 6.

TABLE 6

JOIN Notification Message
<?xml version="1.0" encoding="UTF-8"?>
  <cluster xmlns="urn:Neltura:ClusterManager:v1">
    <NodeJoined>
      <UserId>Francis</UserId>
      <NodeId>28e4eb14</NodeId>
      <IPAddress>112.23.56.1</IpAddress>
    </NodeJoined>
  </cluster>
LEAVE Notification Message
<?xml version="1.0" encoding="UTF-8"?>
  <cluster xmlns="urn:Neltura:ClusterManager:v1">
    <NodeLeft>
      <UserId>Francis</UserId>
      <NodeId>28e4eb14</NodeId>
      <IPAddress>112.23.56.1</IpAddress>
    </NodeLeft>
  </cluster>

3.12.3. Location Index Data Store

Preferably, the location information of all nodes in each cluster is stored in Distributed Data Store 101-10 shown in FIG. 6.

3.12.4. Handling of Specific Node-Related Events

The tasks performed in one embodiment when node joins a cluster, leaves a cluster, goes down, or encounters a network failure, are described below. As will be recognized, these tasks can be varied widely, and represent just one possible embodiment of the invention.

3.12.4.1. A New Node Joins a Cluster

The peer-to-peer layer 101-9 notifies cluster manager 101-5 of a "Join Finished" event when the node has successfully joined the network. The cluster manager 101-5 of the new node then uses the directory entry query client 402 to retrieve the Location Index record of the cluster with the hash value of the user id as the key from the DDS. Cluster manager 101-5 then adds the node information to the location index record. Furthermore cluster manager stores the updated location index record in its cache and uses the directory entry update client 400 to store the updated location index record in DDS 101-10 as well. Cluster manager 101-5 notifies the other nodes in the cluster of the new node information. Each of the nodes which receives the new node notification updates its own cache with the new node information.

3.12.4.2. A Node Leaves a Cluster

When a node leaves a cluster, the peer-to-peer layer 101-9 (FIG. 6) notifies primary cluster manager 101-5 of the cluster of the "Leave Finished" event when the node has successfully left the network. Cluster manager 101-5 of the node uses the directory entry query client 402 to retrieve the location index record of the cluster with the hash value of the user id as the key from the DDS and removes the node information from the location index record. Cluster manager 101-5 the uses the directory entry update client 400 to store the updated location index record in DDS 101-10. Cluster Manager 101-5 also notifies the other nodes in the cluster of the "Node Left" event. Each of the nodes which received the "Node Left" notification updates its own cache (i.e. remove the node entry from the Location Index record).

3.12.4.3. A Node Goes Down

This subsection describes the actions taken by the cluster manager 101-5 of all nodes in the cluster when any one of the node in the cluster goes down. Cluster manager 101-5 of a node monitors the heartbeat of the other nodes in the cluster through a heartbeat subsystem. Cluster manager 101-5 is notified of the "Node Failure" event by the heartbeat subsystem when a node in the cluster goes down. Upon such notification, cluster manager 101-5 uses the directory entry update client 400 to remove the failed node information from its own location index cache. If there is at least one more node alive in the cluster (excluding itself), then the cluster manager 101-5 notifies the other nodes in the cluster of the "Node Failure" event. Otherwise, it uses the directory entry update client 400 to update the location index record in DDS 101-10 immediately and may be finished here. Each of the nodes which received a "Node Failure" notification updates its own cache. To avoid duplication of updating the location index record in the DDS 101-10, only one node needs to be responsible for updating the record in the DDS. This may be accomplished by choosing the node whose information appears first on the location index record to be the keeper of the record for such events.

3.12.4.4. A Node Encounters a Network Failure

If the cluster manager 101-5 of a node detects no heartbeat of all the other nodes in the cluster, then it may simply declare that there is a problem with its network. Once the network problem is resolved (i.e. the node can see the heartbeat of any one node in the cluster), the cluster manager 101-5 of the node retrieves the location index record from the DDS 101-10 and updates its cache accordingly.

4. Interaction and Use Cases

Some sample interactions and use cases that can occur in the system will now be discussed. First, turning to FIGS. 13a-13c, a system is shown wherein a user has a number of communications devices 14 associated with various native network services. Specifically, the system may have a plain old telephone 500 with landline services from a fixed line service provider 503 connected through various access interfaces 501 such as RJ11. This same service may be integrated with a home device 504 such as a PC or TV Set-top box via various connector interfaces 502 such as a voice modem. The home device 504 can access a number of network services such as VoIP and instant messaging from a number of IP service providers 515 via a variety of IP networking interfaces 508 through the internet 514 or managed IP service. The system may also have VoIP service delivered via adapter devices 509 such as an analog-telephone-adaptor (ATA) to plain old telephones 505.

Further, the system may have mobile devices 510 with mobile services provided by wireless carriers 503 via air interfaces 506 such as GSM and CDMA. The same mobile devices 510 may have connection to the internet 514 via IP interfaces 511 such as GPRS and CDMA1X. Network service providers such as traditional circuit switched prepaid calling card service providers and inter-exchange carriers, and VoIP service providers such as Skype, Yahoo, and Vonage can have interconnects with the PSTN/PLMN through circuit switched or IP interfaces 507. The user may also have other portable computing devices 516 such as a smartphone, PDA, or notebook computer that are connected through a variety of access technologies 513 such as Wi-Fi, GPRS, and ADSL.

Figure 13A:
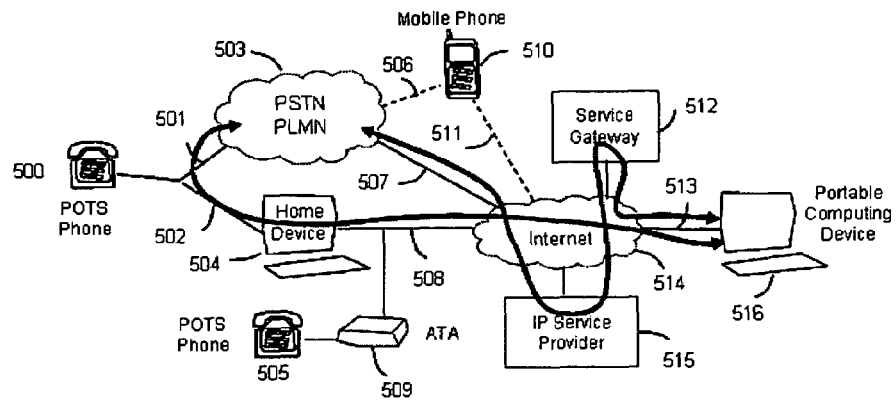
FIG. 13a illustrates a sample system and potential interactions in placing a call from a portable computing device to a typical landline or mobile phone.
Figure 13B:
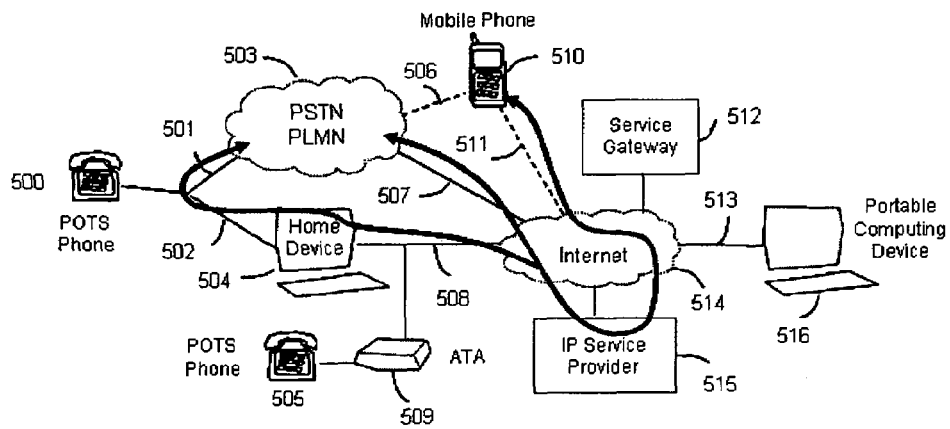
FIG. 13b illustrates a sample system and potential interactions in utilizing the cluster of services to contact another party over alternative services.
Figure 13C:
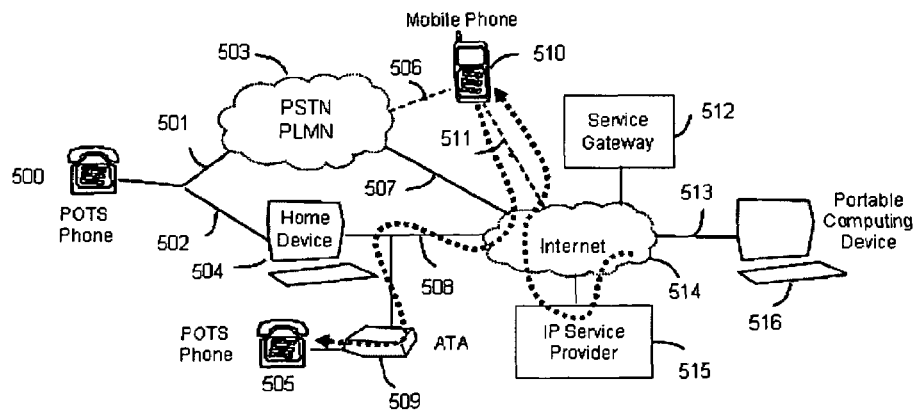
FIG. 13c illustrates a sample system and potential interactions in accepting a call to a cluster or one such device therein.

In one scenario, pictured in FIG. 13a, a user is traveling with his portable computing device 516. The user needs to call a friend on the PSTN or PLMN network. "Thick" client 60 alone on the computing device 516, or "thin" client 70 running on the computing device 516 and coupled with core network elements such as a service gateway 512, can discover a number of services which can be used to access the dialed PSTN/PLMN number including the landline POTS service 501 via an appliance device 504 or voice modem 502 or an IP service 515 such as SkypeOut. It is also possible for users on the PSTN/PLMN or an internet service such as Skype or MSN to call the user on an online identity via 515 or PSTN identity such as 501 and have the session routed directly or through a dynamic session request to the user's portable device 516. Call manager 100 (FIG. 4) and its resolver 202 may then determine which of these services to utilize in placing the call. In effect, the user's otherwise native services such as POTS line 501 can be shared with the user's other devices 14. The same network and online service resources such as home POTS line or online service such as SkypeOut can be extended within a community and shared with the user's family, co-workers, and friends.

In another use case scenario (see FIG. 13b), a user can be at home or at some location where his mobile device 510 can be connected to the Internet 512 or an alternate network with suitable connectivity including SMS transport. The user's mobile device 510 typically runs a thin client 70. As such, the mobile device 510 can utilize thin client 70 to interact with a service gateway 512 (corresponding to reference no. 50 in FIGS. 2 and 3) to leverage the resources and services within the user's cluster of devices such as POTS 501 and VoIP 515 such as SkypeOut to reach someone on an online service such as MSN or Skype on the Internet 514 or a PSTN/PLMN service 503. The user can call his friend this way via his friend's online identities or a PSTN number. The resolver in this solution would deliver the call request correctly to one or more of the user's devices and services using one or more of the user's available services. The service gateway 512 aids in determining the routing of a call, but does not need to actively process the call. Thin client 70 would have initial interactions with service gateway 512 to determine routing using routing engine 90 (FIG. 3), but a thin client can preferably handle the actual call without supervision from the service gateway 512.

Similarly, the user's friends can call the user on his PSTN/PLMN number or the user's online identities such as MSN Instant Messenger ID and reach the user on any one of his devices 14, including his mobile phone 510. Note that the mobile phone 510 in this scenario is normally proxied via the service gateway 512 for the signaling portion of the session between the mobile phone 510 and the user's other devices 14 such as home device 504 and portable device 516 and network service providers 515. The actual media path may also be different. For example, the user utilizing his mobile phone 510 would normally use the PLMN interface 506 to talk to his friends on the mobile phone 510's native PSTN/PLMN network 503, or use one of his computing devices 516 to talk to his friend on another computing device on the internet 514 or on a PSTN or PLMN network 503 via circuit switched or IP interfaces 507. In this case, a call path can be set up between the IP service provider 515 or one of the user's computing devices 14 such as home device 504 through circuit switched or IP interfaces 507 and then air interfaces 506 to the user's mobile phone 510. A second call path is setup between the same respective home device 504 or network service 515 and the user's contact via the internet 514 or the PSTN/PLMN 503 via the home device 504 through a POTS line 501 or an IP service 515 such as SkypeOut via the carrier interface 507. In this specific scenario, network interface 506 is used to provide basic service access, but bypasses air interface 506 and PSTN/PLMN network 503 as the long distance services network connecting the user and his contact.

When a user's friend calls (see FIG. 13c), the user can receive the call notification on any one of his devices 14 such as his mobile phone 510 or his TV set-top box 504, and can dynamically route the call to any one of his devices 14 such as his portable desktop computer 516 or an alternate phone service 505 such as his office phone. If a friend calls a specific user device 14, the device may receive the call itself if it is running the "thick" client 60. The user is then notified of the incoming call and allowed to choose to receive the call on that specific device or reroute the call to another device 14. In the latter case, call manager 100 may then take control of the call and reroute it to another device in the cluster.

It is also possible for a device running a "thin" client 70 to receive calls in this manner, but in such a case, the service gateway 50 generally intercepts the call and reroutes it as desired by a user. In either case, calls may be rerouted without notice to the user if the user has set up predetermined routing or, for example, wishes least cost routing to be utilized. The user can also specify the device or service to use when initiating a call. For instance, the user can initiate a call via his contact list on his mobile device 510 and take the actual call on another device such as POTS phone 505. Similarly, the user can dynamically hand-off calls from one device or service to another device and service in a similar way. This may be accomplished using the dynamic call control methods described in U.S. Provisional Application No. 60/695,311, filed Jun. 30, 2005.

The solution also has a number of practical applications for network bypass and least cost routing. For instance, with further reference to FIG. 13c, the user may be at home with his mobile device 510, which may be equipped with a VoIP client and connected via Wi-Fi 511. When the user makes a call to the internet or to the PSTN/PLMN, the resolver 202 (FIG. 6) may determine that the least cost may be to place the call on the user's home line service 501 via his home device 504.

Similarly, when the user wants to call his friend overseas, the routing engine 90 (FIG. 3) can determine that SkypeOut 515 is the least cost network. In such a case, the service gateway 512 directly or via a distributed call management client on a connected device 504 such as home PC can connect the user on his Mobile phone via SkypeOut, and a second call leg can be set up via the user's SkypeOut or his friend's SkypeOut to the user's friend's PSTN/PLMN phone. This effectively bypasses the long distance services network natively tied to the user's mobile phone 510.

The various features and functions described in this document may be embodied in software modules executed by general purposes computing devices. The modules may be stored in any type of computer storage medium or device.

Although this invention has been described in terms of certain preferred embodiments and applications, other embodiments and applications that are apparent to those of ordinary skill in the art, including embodiments and applications which do not provide all of the features and advantages set forth herein, are also within the scope of this invention. The scope of the present invention is intended to be defined only by reference to the appended claims.

What is claimed is:

1. A communications system, comprising:
    a first cluster of user computing devices associated with a first user, said first cluster of user computing devices providing access to a plurality of communication service resources of the first user;
    a second cluster of user computing devices associated with a second user, said second cluster of computing devices providing access to a plurality of communication service resources of the second user; and
    distributed call management software that runs at least partly on the first and second clusters of user computing devices, said distributed call management software providing functionality for the first user to selectively grant permission to the second user to use one or more of the communication service resources of the first user to place calls, and providing functionality for the second user to selectively grant permission to the first user to use one or more of the communication service resources of the second user to place calls, said distributed call management software further including functionality for automatically routing calls according to said permissions.

2. The communications system of claim 1, wherein the distributed call management software enables the first user to limit the permission granted to the second user to a designated set of telephone numbers.

3. The communications system of claim 1, wherein the distributed call management software is capable of taking a busy status of a telephone line of the first user into consideration in determining whether to use a communications service resource of the second user to place a call initiated by the first user.

4. The communications system of claim 1, wherein the plurality of communication service resources of the first user comprises a long distance calling plan of the first user, and the distributed call management software enables the first user to grant permission to the second user to use said long distance calling plan, such that the second user can place calls via said long distance calling plan from user computing devices in the second cluster.

5. The communications system of claim 1, wherein the distributed call management software provides functionality for the first and second users to specify time schedules for sharing their respective communication service resources with each other.

6. A computer-implemented method of sharing service resources, the method comprising:
    receiving, and storing on a computing device of a first user, permission data representing a permission granted by the first user to a second user to use a service resource of the first user, said service resource selected from a plurality of service resources associated with a plurality of devices of the first user, said service resource providing communication functionality for placing calls;
    communicating the permission data over a network to a computing device of the second user, wherein the permission data is communicated to the computing device of the second user automatically via execution of distributed call management software that runs at least partly on the computing devices of the first and second users; and on the computing device of the second user, using the permission data to route a call initiated by the second user to cause the call to be placed using the service resource of the first user.

7. The method of claim 6, wherein the step of using the permission data to route the call comprises establishing a connection over the network between the computing device of the second user and the computing device of the first user.

8. The method of claim 6, wherein the call is routed to the service resource using a central server on behalf of the first user, without involvement of any computing device of the first user.

9. The method of claim 6, wherein the computing device of the first user is one of a plurality of computing devices that form a service cluster of the first user, each of said plurality of computing devices running software that provides functionality for sharing service resources.

10. The method of claim 6, wherein the service resource of the first user is a long distance calling plan of the first user.

11. The method of claim 6, wherein the service resource of the first user is at least one of the following: a landline telephone service account, a mobile telephone service account, a voice-over-IP service account.

12. The method of claim 6, further comprising exposing said permission on a user interface of the second computing device to enable the second user to selectively choose whether to use the service resource to place calls.

13. The method of claim 6, wherein the permission data specifies a time schedule indicating time periods in which the second user is permitted to use the service resource, and the computing device of the second user uses the time schedule to determine how to route calls.

14. The method of claim 6, wherein the permission data limits the permission to calls placed to a set of one or more telephone numbers designated by the first user.

15. The method of claim 6, wherein the permission data specifies a maximum call duration for placing a call using said service resource.

16. The method of claim 6, wherein the permission data specifies a plurality of service resources of the first user that are made available to the second user.

17. A distributed software system that embodies the method of claim 6 stored in computer storage.

18. Computer storage comprising distributed call management software adapted to run at least partly on a first cluster of user computing devices associated with a first user and a second cluster of user computing devices associated with a second user, said first cluster of user computing devices providing access to a plurality of communication service resources of the first user; and said second cluster of user computing devices providing access to a plurality of communication service resources of the second user, said distributed call management software providing functionality for the first user to selectively grant permission to the second user to use one or more of the communication service resources of the first user to place calls, and providing functionality for the second user to selectively grant permission to the first user to use one or more of the communication service resources of the second user to place calls, said distributed call management software further including functionality for automatically routing calls according to said permissions.

19. The computer storage of claim 18, wherein the distributed call management software enables the first user to limit the permission granted to the second user to a designated set of telephone numbers.

20. The computer storage of claim 18, wherein the distributed call management software is capable of taking a busy status of a telephone line of the first user into consideration in determining whether to use a communications service resource of the second user to place a call initiated by the first user.

21. The computer storage claim 18, wherein the plurality of communication service resources of the first user comprises a long distance calling plan of the first user, and the distributed call management software enables the first user to grant permission to the second user to use said long distance calling plan, such that the second user can place calls via said long distance calling plan from user computing devices in the second cluster.

22. The computer storage of claim 18, wherein the distributed call management software provides functionality for the first and second users to specify time schedules for sharing their respective communication service resources with each other.

* * * * *